United States Patent
Yanagisawa et al.

(10) Patent No.: US 7,164,815 B2
(45) Date of Patent: Jan. 16, 2007

(54) MANUFACTURING METHOD OF AN OPTICAL WAVEGUIDE

(75) Inventors: Kenji Yanagisawa, Nagano (JP); Junichi Iwai, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 0 days.

(21) Appl. No.: 11/228,560

(22) Filed: Sep. 16, 2005

(65) Prior Publication Data

US 2006/0110114 A1  May 25, 2006

(30) Foreign Application Priority Data

Oct. 19, 2004   (JP) ............... 2004-304677

(51) Int. Cl.
*G02B 6/12* (2006.01)
*G02B 6/13* (2006.01)
*G02B 6/42* (2006.01)

(52) U.S. Cl. .......................... 385/14; 385/47
(58) Field of Classification Search ................. 385/14, 385/47
See application file for complete search history.

(56) References Cited

U.S. PATENT DOCUMENTS

| | | | | |
|---|---|---|---|---|
| 4,966,430 A * | 10/1990 | Weidel | ............ | 385/14 |
| 5,999,670 A * | 12/1999 | Yoshimura et al. | ............ | 385/31 |
| 6,243,524 B1 * | 6/2001 | Funabashi | ............ | 385/129 |
| 6,370,292 B1 * | 4/2002 | Strake | ............ | 385/14 |
| 6,661,939 B1 * | 12/2003 | Kaneko et al. | ............ | 385/14 |
| 6,913,705 B1 * | 7/2005 | Nakata | ............ | 216/24 |
| 6,959,125 B1 * | 10/2005 | Kanda et al. | ............ | 385/14 |
| 2005/0163416 A1 * | 7/2005 | Yamada et al. | ............ | 385/14 |

FOREIGN PATENT DOCUMENTS

JP   2000098153 A  *  4/2000
JP   2000-304953      11/2000

* cited by examiner

*Primary Examiner*—Michelle Connelly-Cushwa
(74) *Attorney, Agent, or Firm*—Ladas & Parry LLP

(57) ABSTRACT

A manufacturing method of an optical waveguide is disclosed, the optical waveguide transmitting an optical signal between a luminous source and an optical receiver. The optical waveguide is structured by forming a lower clad layer, a core section, and an upper clad layer one by one on a substrate; by forming a first slot and a second slot each dividing the core section from the side of the upper clad layer that is not connected to the substrate; and by forming a metal film in the first and second slots such that a first mirror and a second mirror are formed.

3 Claims, 28 Drawing Sheets

MANUFACTURING METHOD OF AN OPTICAL WAVEGUIDE

BACKGROUND OF THE INVENTION

1. Field of the Invention

The present invention relates to a manufacturing method of an optical waveguide, and especially relates to a manufacturing method of an optical waveguide for transmitting an optical signal between a luminous source and an optical receiver.

2. Description of the Related Art

In recent years and continuing, improvements in the speed of data communications are attained, and an electrical signal is converted into an optical signal that is transmitted using light as a medium of the data communication. In such an optical communications field, it is necessary to convert an electrical signal into an optical signal, and vice versa; and to modulate the light. For this purpose, various optical modules are used. Although there are various optical modules, the optical modules are fundamentally constituted by an optical waveguide on a substrate on which a luminous source (a vertical resonance laser, etc.) and an optical receiver (a photo diode, etc.) are arranged.

FIG. 1 is a cross-sectional view of a conventional optical module 10. As shown in FIG. 1, the optical module 10 includes a substrate 20, an optical waveguide 30, a luminous source 50, and an optical receiver 55. To the substrate 20, a lower wiring pattern 23 and an upper wiring pattern 27 are formed by patterning copper foils provided on the front and back surfaces of a base material 21. Further, the lower wiring pattern 23 and the upper wiring pattern 27 are electrically connected through a penetration via 22 formed in the base material 21. A solder resist 25 for protecting the lower wiring pattern 23 is arranged on the undersurface of the base material 21. The solder resist 25 has an opening at a position where a solder ball 26 is arranged, and the solder ball 26 that serves as an external connection terminal through the aperture is connected to the lower wiring pattern 23.

On the substrate 20 structured as described above, the optical waveguide 30, to which the luminous source 50 and the optical receiver 55 are connected, is fixed by adhesives 29.

FIG. 2 is an elevational view of the optical waveguide viewed in a direction A shown in FIG. 1. The optical waveguide 30 includes a lower clad layer 31, a core section 32, an upper clad layer 33, penetration vias 35, a device connection wiring pattern 39, a solder resist 41, and mirrors 45 and 46. The core section 32 is for transmitting an optical signal, and is formed on the lower clad layer 31. The upper clad layer 33 is formed on the lower clad layer 31 so that the core section 32 may be covered. Here, the refractive index of the material of the core section 32 is set up to be greater than the refractive index of the material of the lower and the upper clad layers 31 and 33.

The penetration via 35 is for electrically connecting the device connection wiring pattern 39 formed on the upper clad layer 33, and the upper wiring pattern 27 formed on the substrate 20. The solder resist 41 is prepared on the upper clad layer 33 for exposing a part of the device connection wiring pattern 39 where external connection terminals 51 and 56 of the luminous source 50 and the optical receiver 55, respectively, are connected, and for covering other parts of the device connection wiring pattern 39. Further, an optical entrance 42 for introducing the optical signal from the luminous source 50 to the core section 32, and an optical exit 43 for introducing the optical signal reflected by the mirror 46 to the optical receiver 55 are formed by the solder resist 41.

The mirrors 45 and 46 are formed in slots 57 and 58 that are formed in a V character shape from the side of the lower clad layer 31. The mirror 45 is for introducing the optical signal from the luminous source 50 into the core section 32. The mirror 46 is for reflecting the optical signal transmitted by the core section 32 so that it may reach the optical receiver 55. The optical signal introduced into the optical receiver 55 is converted to an electrical signal by the optical receiver 55. Further, after forming the mirrors 45 and 46, the slots are filled up with a clad material 47 serving as a reinforcing material.

Next, with reference to FIG. 3 through FIG. 7, a conventional manufacturing method of the mirrors 45 and 46 of the optical waveguide 30 is described. FIG. 3 through FIG. 6 show manufacturing processes of the mirrors, and FIG. 7 is an elevational view of the lower clad layer, the core section, and the upper clad layer looking in a direction of B shown in FIG. 3.

As shown in FIG. 3, the lower clad layer 31, the core section 32, and the upper clad layer 33 are formed one by one. Next, as shown in FIG. 4, the slots 57 and 58 in the shape of a V character dividing the core section 32 are formed by a dicer (dicing equipment) from the side of the lower clad layer 31. At this time, angles θ1 and θ2 between inclined planes 57a and 57b, respectively, and the undersurface 31a of the lower clad layer 31 are set at 45°, the inclined planes 57a and 57b being exposed by the slot 57. Further, angles θ3 and θ4 between inclined planes 58a and 58b, respectively, and the undersurface 31a of the lower clad layer 31 are also set at 45°, the inclined planes 58a and 58b being exposed by the slot 58.

Then, as shown in FIG. 5, a metal film is formed in the slots 57 and 58, and the mirrors 45 and 46 are formed on the inclined planes 57b and 58a, respectively. Then, as shown in FIG. 6, the clad material 47 serving as a reinforcing material is used to fill up the slots 57 and 58 (for example, Patent Reference 1).

[Patent reference 1] JPA, 2000-304953

[Description of the Invention]

[Problem(s) to be Solved by the Invention]

As described above, when conventionally manufacturing the optical waveguide 30, the V character-like slots 57 and 58 are formed from the side of the lower clad layer 31 that is pasted to the substrate 20, the metal film is formed in the slots 57 and 58, and the mirrors 45 and 46 are formed.

For this reason, the optical waveguide 30 cannot be formed in one body with the substrate 20, and a problem is in that the substrate 20 and the optical waveguide 30 have to be manufactured by separate manufacture processes.

SUMMARY OF THE INVENTION

The present invention is made in view of the problem described above, and aims at offering a manufacturing method of an optical waveguide that can be formed in one body with a substrate as a part of a manufacturing process of the substrate.

It is a general object of the present invention to provide a manufacturing method of an optical waveguide that substantially obviates one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a manufacturing method of an optical waveguide particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

An aspect of the present invention provides a manufacturing method of an optical waveguide that includes a first clad layer, a core section formed on the first clad layer for transmitting an optical signal, a second clad layer formed on the first clad layer for covering the core section, a first mirror for reflecting an optical signal emitted by a luminous source, and leading the optical signal to the core section, and a second mirror for reflecting the optical signal introduced into the core section, and leading the optical signal to an optical receiver, wherein the optical waveguide is connected to the substrate through the first clad layer, the manufacturing method including a clad layer and core section formation process of laminating the first clad layer, the core section, and the second clad layer one by one, a slot formation process of forming a first slot that divides the core section from the side of the second clad layer, and a second slot that divides the core section from side of the second clad layer at a position different from the first slot, and a mirror formation process of forming the first mirror at the first slot and the second mirror at the second slot by forming metal films in the first slot and the second slot.

According to the aspect of the present invention, the first clad layer, the core section, and the second clad layer are laminated on the substrate one by one, the first slot that divides the core section is formed from the side of the second clad layer that is not connected to the substrate, the second slot that divides the core section is formed at the position different from the first slot, metal films are formed in the first and second slots, the first mirror is formed in the first slot, and the second mirror is formed in the second slot. That is, the optical waveguide is formed in one body with the substrate as a part of the manufacturing process of the substrate.

According to another aspect of the present invention, a metal film removal process is provided wherein a first metal film is removed, the first metal film being a part of the metal film formed all over the first slot in the core section by the mirror formation process, the part being on the side toward the second slot of the first slot, and a second metal film is removed, the second metal film being a part of the metal film formed all over the second slot in the core section by the mirror formation process, the part being on the side toward the first slot of the second slot.

According to the present aspect, in the mirror formation process, when the metal films are formed all over the first and second slots, the first and second metal films that exist in the optical path between the first mirror and the second mirror through which the optical signal is to be transmitted are removed, and the optical signal between the luminous source and the optical receiver is transmitted by the first and second mirrors.

Another aspect of the present invention provides the manufacturing method of the optical waveguide including a core material filling process of filling up the first slot where the first mirror is formed, and the second slot where the second mirror is formed with the core material.

According to the present aspect, the portions where the core section is divided are filled up with the core material such that the first and second mirrors and the core material are in contact, and attenuation of the optical signal immediately after being reflected by the first and second mirrors is reduced. Further, the refractive index of the optical path between the first mirror and the second mirror through which the optical signal is transmitted is made approximately the same as the core section.

An aspect of the present invention provides a manufacturing method of an optical waveguide that includes a first clad layer, a core section formed on the first clad layer for transmitting an optical signal, a second clad layer formed on the first clad layer for covering the core section, a first mirror for reflecting an optical signal emitted by a luminous source, and leading the optical signal to the core section, and a second mirror for reflecting the optical signal introduced to the core section, and leading the optical signal to an optical receiver, wherein the optical waveguide is connected to the substrate through the first clad layer, the manufacturing method including a core layer formation process of forming a core layer to serve as the base material of the core section on the first clad layer, a slot formation process of forming from the core layer side the first slot that divides the core layer corresponding to the core section, and the second slot that divides the core layer corresponding to the core section with a distance from the first slot, a mirror formation process of forming the first mirror at the first slot, and the second mirror at the second slot by forming metal films in the first and the second slots, a core material filling process of filling up the first slot wherein the first mirror is formed, and the second slot wherein the second mirror is formed with the core material, a core section formation process of etching the core layer wherein the core material is used as filler, and forming the core section, and a second clad layer formation process of forming the second clad layer on the first clad layer so that the core section is covered.

According to the present aspect, the core layer serving as the base material of the core section is formed on the first clad layer, the first and second slots that divide the core layer are formed, and then the metal films are formed in the first and second slots such that the first mirror is formed in the first slot, and the second mirror is formed in the second slot. Then, the first and second slots are filled with the core material that is the material of the core section, and the core layer is etched such that the core section is formed. Then, the second clad layer is formed on the first clad layer so that the core section may be covered. In this way, the manufacturing process of the substrate and the manufacturing process of the optical waveguide are not separated, which processes are separated in the conventional manufacturing method. The optical waveguide is manufactured as a part of the manufacturing process of the substrate, and in one body with the substrate. Further, the first slot wherein the first mirror is formed, and the second slot wherein the second mirror is formed are filled up with the core material that is the material of the core section, and the second clad layer is formed so that it may cover the upper surface and the sides of the core section between the first mirror and the second mirror, which reduces emission of the optical signal from the core section through the boundary of the core section and the second clad layer, and reduces transmission attenuation of the optical signal transmitted between the first mirror and the second mirror.

Another aspect of the present invention provides the metal film removal process as described in the following. The metal film is formed all over the first and the second slots in the mirror formation process. The first metal film of the first slot is removed from the core section on the side of the second slot, and the second metal film of the second slot is removed from the core section on the side of the first slot.

According to the present aspect, in the mirror formation process, when a metal film is formed all over the first and second slots, the first and second metal films that are present in the optical path between the first mirror and the second mirror through which the optical signal is to be transmitted are removed, and the optical signal between the luminous source and the optical receiver is transmitted by the first and second mirrors.

EFFECT OF THE INVENTION

As described above, according to the present invention, an optical waveguide can be formed in one body with a substrate as a part of the manufacturing process of a substrate.

DESCRIPTION OF THE PREFERRED EMBODIMENTS

In the following, embodiments of the present invention are described with reference to the accompanying drawings.

(The First Embodiment)

Figure 1:
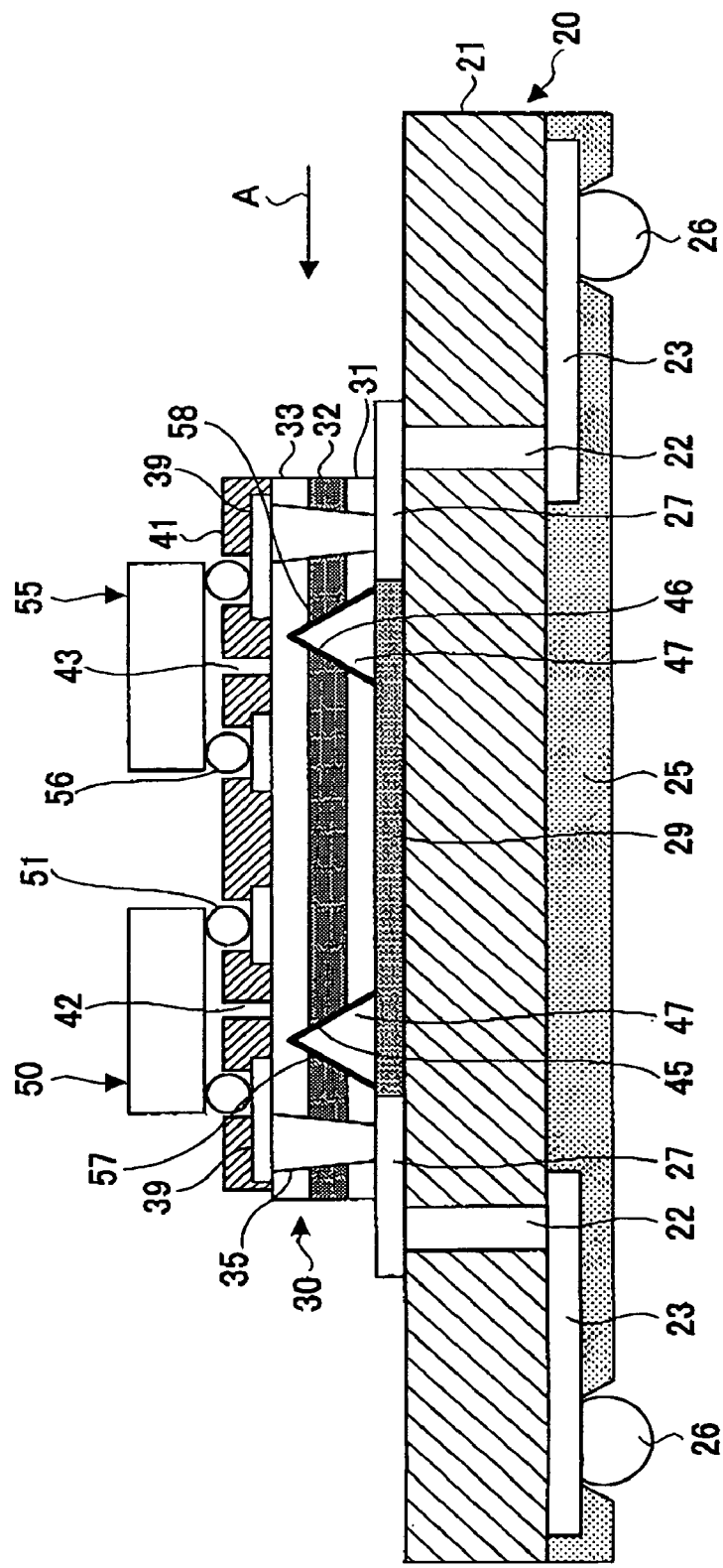
FIG. 1 is a cross-sectional view of a conventional optical module.
Figure 2:
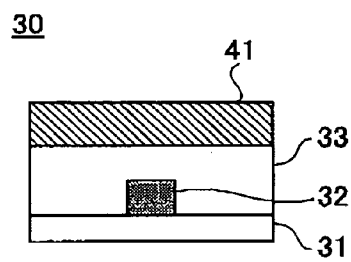
FIG. 2 is an elevational view of the conventional optical waveguide viewed in a direction A shown in FIG. 1.
Figure 3:
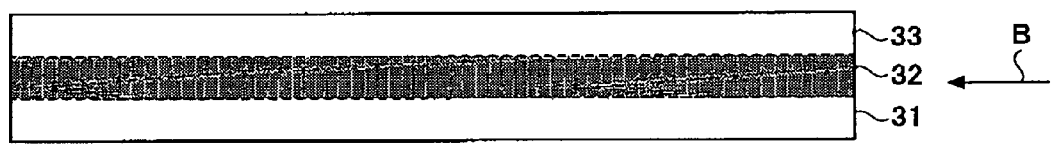
FIG. 3 is a cross-sectional view (No. 1) showing a manufacturing process of mirrors of the conventional optical waveguide.
Figure 4:
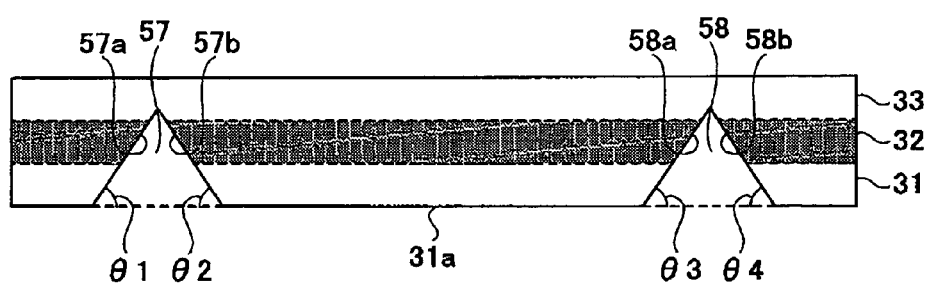
FIG. 4 is a cross-sectional view (No. 2) showing the manufacturing process of the mirrors of the conventional optical waveguide.
Figure 5:
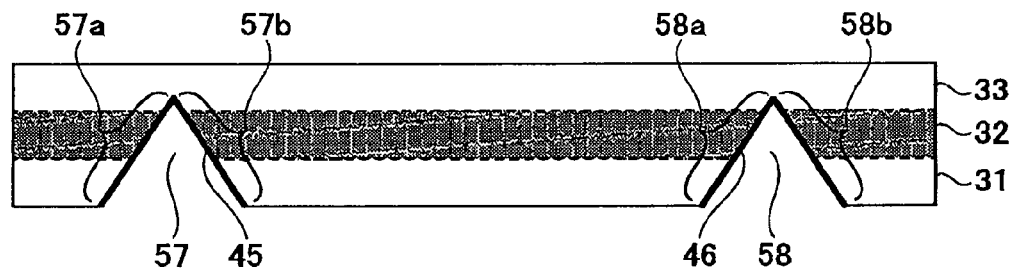
FIG. 5 is a cross-sectional view (No. 3) showing the manufacturing process of the mirrors of the conventional optical waveguide.
Figure 6:
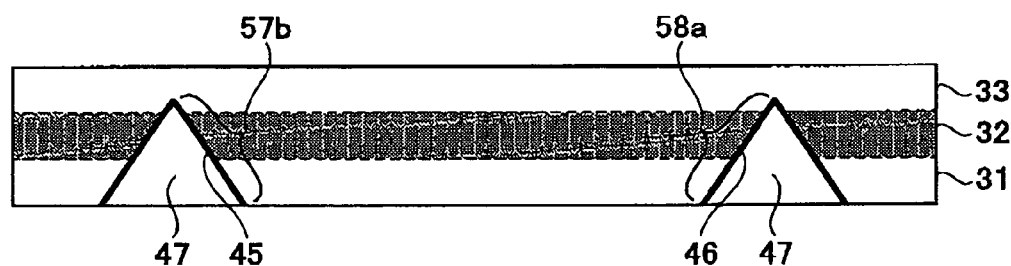
FIG. 6 is a cross-sectional view (No. 4) showing the manufacturing process of the mirrors of the conventional optical waveguide.
Figure 7:
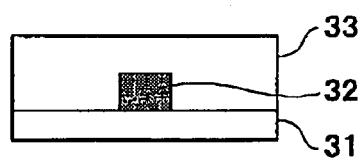
FIG. 7 is an elevational view of a lower clad layer, a core section, and an upper clad layer looking in a direction shown in FIG. 3.
Figure 8:
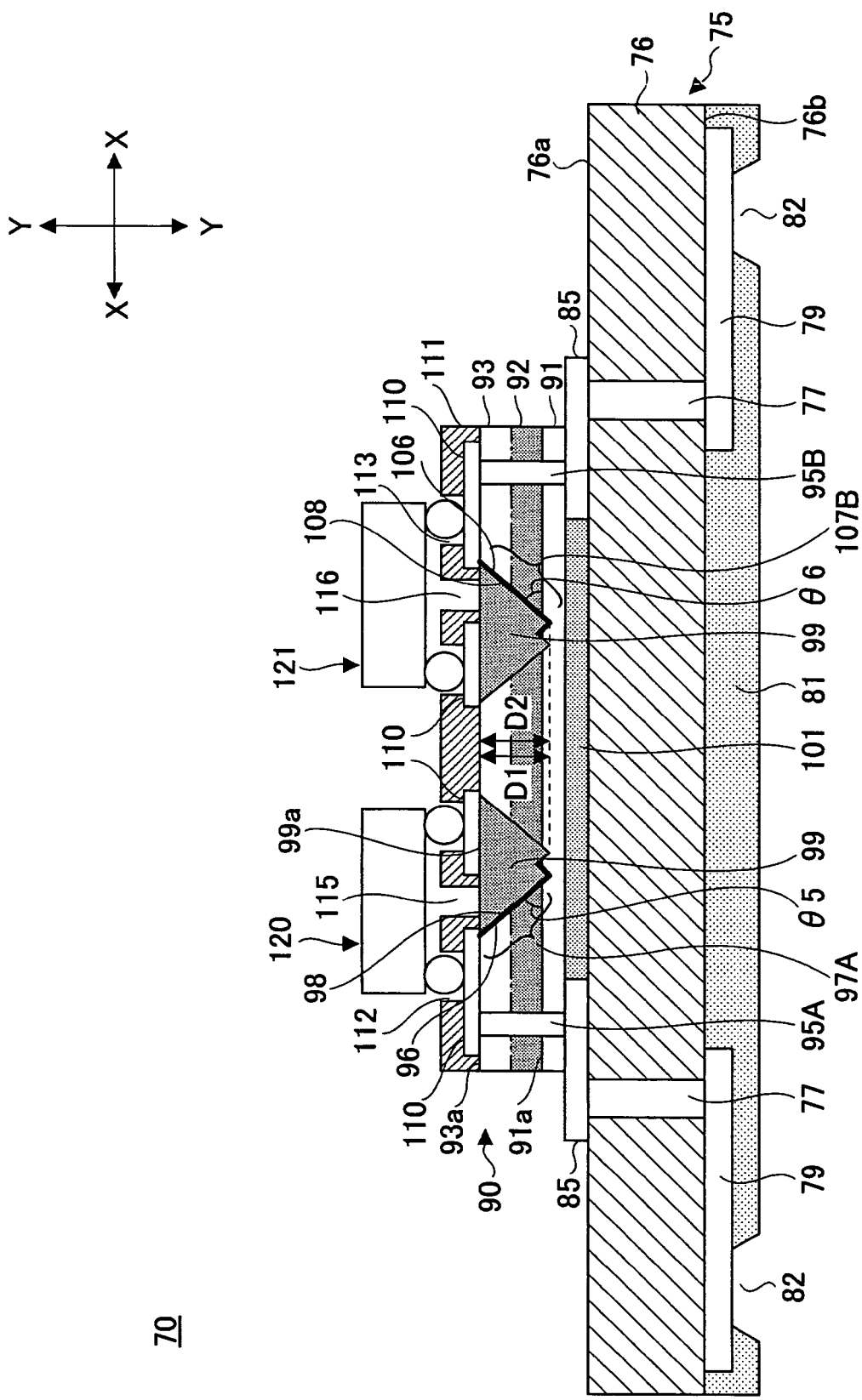
FIG. 8 is a cross-sectional view of an optical module according to the first embodiment of the present invention.

With reference to FIG. 8, an optical module 70 according to the first embodiment of the present invention is described. FIG. 8 is a cross-sectional view of the optical module 70 according to the first embodiment of the present invention. Here, in FIG. 8, a surface 76b is a surface of a base material 76, which surface is the side that is mounted to a mother board (not shown), and a surface 76a is the opposite surface of the base material 76, which surface mounts an optical waveguide 90. Further, in FIG. 8, X—X directions are the longitudinal directions of a core section 92; and Y—Y directions are directions perpendicular to the surfaces of a lower clad layer 91 and an upper clad layer 93.

The optical module 70 includes a substrate 75, the optical waveguide 90, a luminous source 120, and a optical receiver 121. The substrate 75 includes the base material 76, penetration vias 77, lower wiring patterns 79, a solder resist 81, and upper wiring patterns 85. The penetration vias 77 are for connecting the upper wiring patterns 85 and the corresponding lower wiring patterns 79, and are formed penetrating the base material 76. The lower wiring patterns 79 are formed on the surface 76b of the base material 76, and are connected to the corresponding penetration vias 77. The solder resist 81 has openings 82 that expose the lower wiring patterns 79 corresponding to places to which solder balls (not shown) are to be connected, and is formed to cover the lower wiring pattern 79 other than the places to which the solder balls are to be connected and the surface 76b of the base material 76. The solder balls to be connected to the lower wiring patterns 79 are external connection terminals for connecting the mother board (not shown), and the like. The upper wiring patterns 85 are formed on the surface 76a of the base material 76 being connected to the corresponding penetration vias 77. The upper wiring patterns 85 are wiring patterns that are electrically connected to corresponding penetration vias 95A and 95B of the optical waveguide 90.

The optical waveguide 90 is fixed to the substrate 75 by adhesives 101 provided between the lower clad layer 91 and the base material 76. The optical waveguide 90 includes the lower clad layer 91, the core section 92, the upper clad layer 93, the penetration vias 95A and 95B, a first slot 96, a second slot 106, a first mirror 98, a second mirror 108, a core material 99, a device connection wiring pattern 110, and a solder resist 111.

The lower clad layer 91 that is the first clad layer is formed such that the upper wiring patterns 85 (i.e., two upper wiring patterns 85 shown in FIG. 8) are connected. Further, the lower clad layer 91 is connected to the base material 76 through the adhesives 101. The core section 92 is arranged on the lower clad layer 91. The core section 92 is for transmitting an optical signal. The core material that is the material of the core section 92 is chosen so that its refractive index is greater rather than the clad material that is the material of the lower clad layer 91 and the upper clad layer 93. The upper clad layer 93 that is the second clad layer 93 is formed on the lower clad layer 91 so that the core section 92 divided by the first and second slots 96 and 106 may be covered. In the embodiment, the thickness of each of the upper clad layer 93, the core section 92, and the lower clad layer 91 is set at 50 μm.

The penetration via 95A penetrates the lower clad layer 91, the core section 92, and the upper clad layer 93, and is prepared in a region (left-hand side of FIG. 8) where the upper wiring pattern 85 and the lower clad layer 91 touch. The penetration via 95B penetrates the lower clad layer 91, the core section 92, and the upper clad layer 93, and is prepared in a region (right-hand side of FIG. 8) where the upper wiring pattern 85 and the lower clad layer 91 touch.

The first and second slots 96 and 106 are slots that divide the core section 92, and are formed to the inside of the corresponding penetration vias 95A and 95B. The first and second slots 96 and 106 are formed from the upper clad layer 93 to the lower clad layer 91. The first slot 96 has an inclined plane 97A on the side of the penetration via 95A, and the inclined plane 97A is formed penetrating the upper clad layer 93, the core section 92, and the lower clad layer 91. Further, an angle θ5 between the inclined plane 97A and a surface 91a of the lower clad layer 91 is made to be 45°.

The second slot 106 has an inclined plane 107B on side of the penetration via 95B, and the inclined plane 107B is formed penetrating the upper clad layer 93, the core section 92, and the lower clad layer 91. Further, an angle θ6 between the inclined plane 107B and the surface 91a of the lower clad layer 91 is made to be 45°. In addition, the surface 91a of the lower clad layer 91 is the surface that contacts the core section 92. Further, where the thickness of each of the upper clad layer 93, the core section 92, and the lower clad layer 91 is set at 50 μm, for example, each of a depth D1 of the first slot 96, and a depth D2 of the second slot 106 can be set at 125 μm.

The first mirror 98 is formed on the inclined plane 97A. The first mirror 98 is for reflecting the optical signal from the luminous source 120, and leading the optical signal to the core section 92. The second mirror 108 is formed on the inclined plane 107B. The second mirror 108 is for reflecting the optical signal transmitted by the core section 92 (including the core materials 99 that fill up the first and second slots 96 and 106) in the direction to the optical receiver 121 (i.e., upward in FIG. 8). As the first and second mirrors 98 and 108, an Au film formed by a vacuum deposition method can be used, for example. In this case, the thickness of the Au film can be 1 μm or less, more preferably, about 0.5 μm.

The core material 99 is used to fill up the first slot 96 where the first mirror 98 is formed, and the second slot 106 where the second mirror 108 is formed so that an upper surface 99a of the core material 99 and an upper surface 93a of the upper clad layer 93 may become even (the same level). The core material 99 is the same material as the core material of the core section 92.

As described above, by filling up the first slot 96 where the first mirror 98 is formed and the second slot 106 where the second mirror 108 is formed with the core material 99 that is the same as the core material of the core section 92, and making the first mirror 98 and the second mirror 108 contact the core material 99, the optical signal can be reflected in the conventional manner by the first and second mirrors 98 and 108. Further, the refractive index of the optical path between the first mirror 98 and the second mirror 108 through which the optical signal is transmitted can be made the same as the refractive index of the core section 92.

The device connection wiring pattern 110 is formed on the upper surface 93a of the upper clad layer 93, and on the core material 99. The luminous source 120 and the optical receiver 121 device are connected to the connection wiring pattern 110. The solder resist 111 has openings 112 and 113, an optical entrance 115, and an optical exit 116, and covers the upper clad layer 93, the core material 99, and the device connection wiring pattern 110. The opening 112 is for exposing the device connection wiring pattern 110 at the portion where the luminous source 120 is connected. The opening 113 is for exposing the device connection wiring pattern 110 at the portion where the optical receiver 121 is connected. The optical entrance 115 is for leading the optical signal from the luminous source 120 to the first mirror 98. Further, the optical exit 116 is for leading the optical signal transmitted by the core section 92 and reflected by the second mirror 108 to the optical receiver 121.

The luminous source 120 is connected to the device connection wiring pattern 110 that is exposed at the opening 112. The luminous source 120 is for outputting the optical signal to the first mirror 98. The optical receiver 121 is connected to the device connection wiring pattern 110 that is exposed at the opening 113. The optical receiver 121 is for receiving the optical signal reflected by the second mirror 108, and converting the optical signal into an electrical signal.

Figure 14:
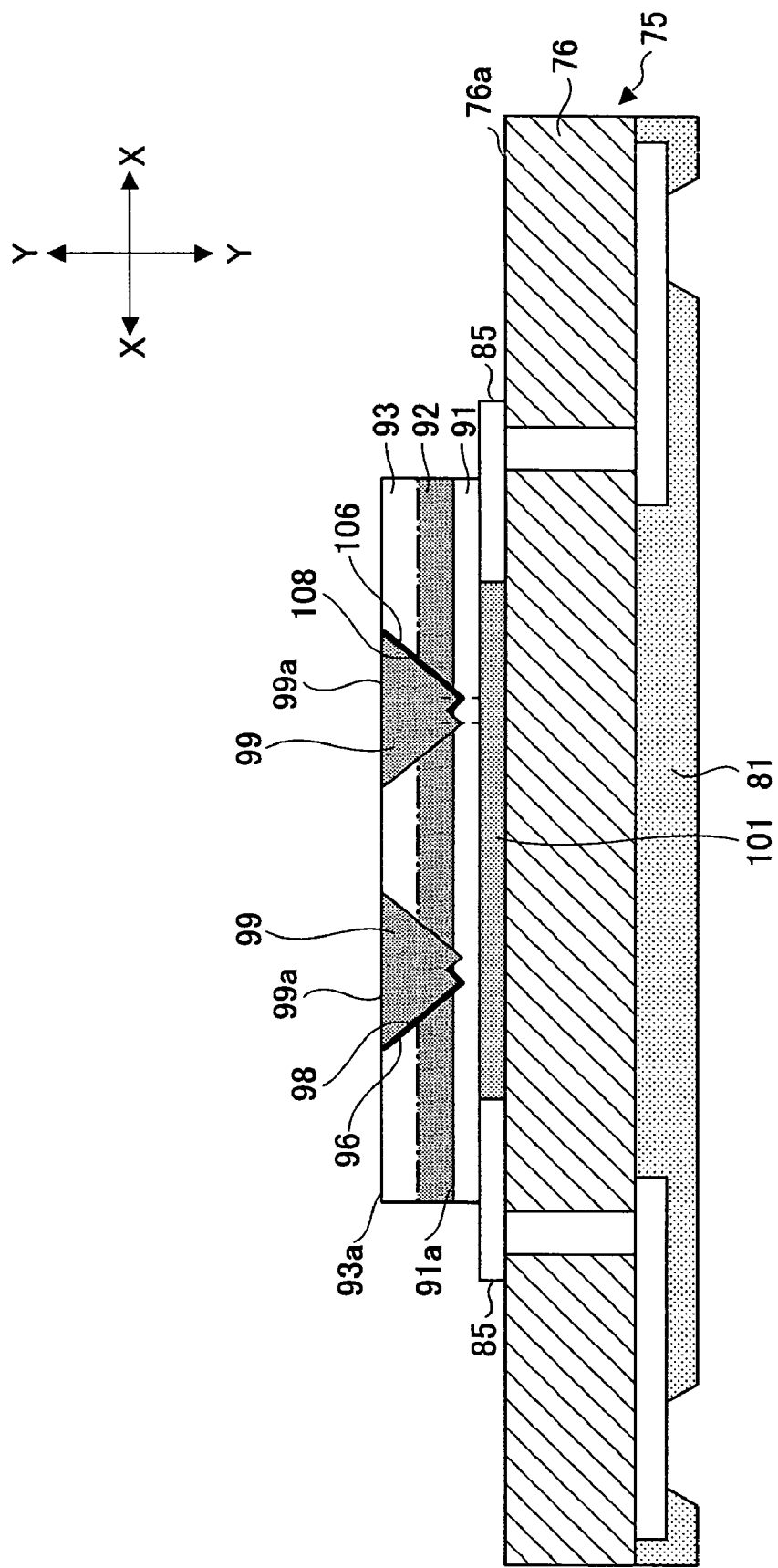
FIG. 14 is a cross-sectional view (No. 6) showing the manufacturing process of the optical waveguide of the first embodiment.
Figure 15:
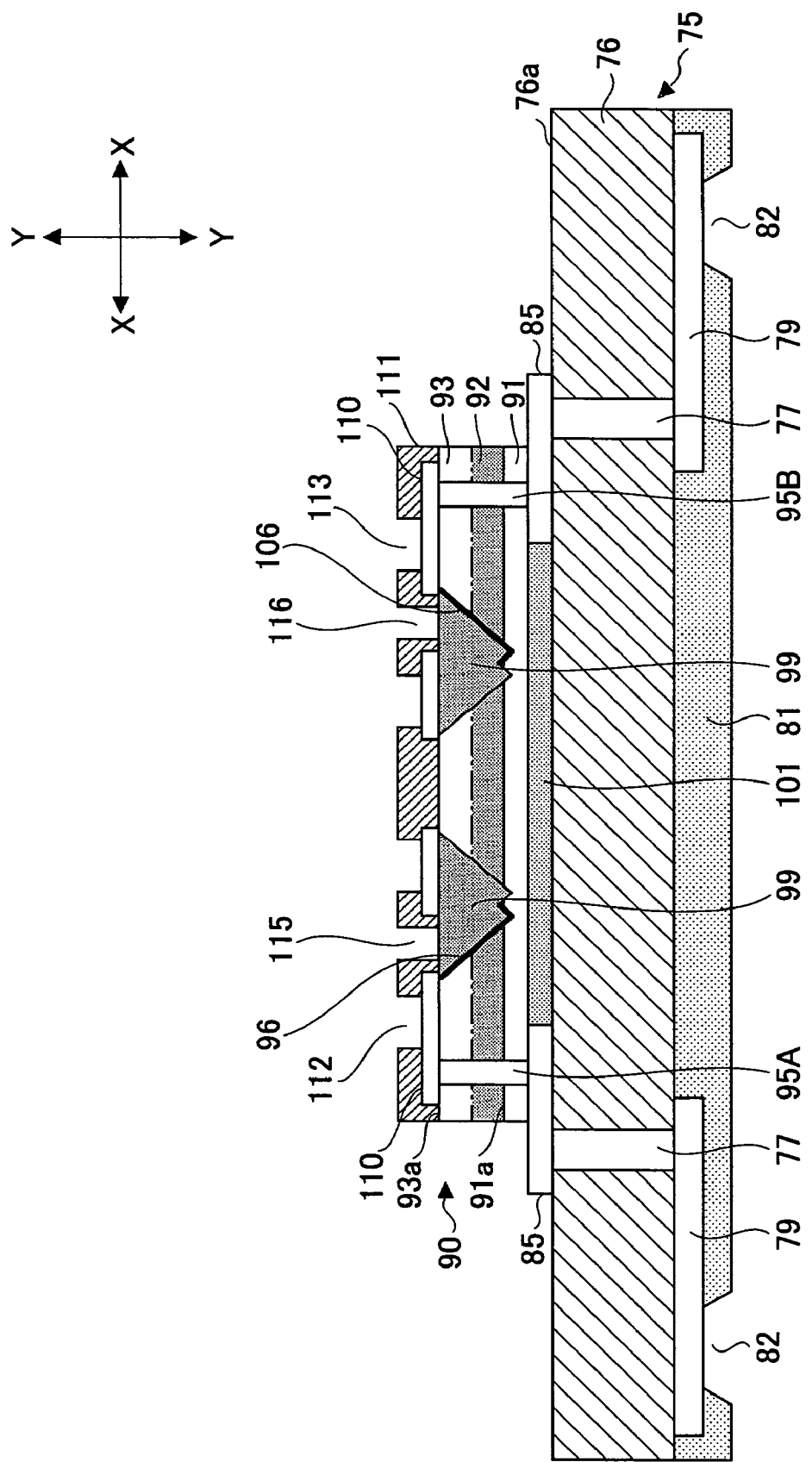
FIG. 15 is a cross-sectional view (No. 7) showing the manufacturing process of the optical waveguide of the first embodiment.
Figure 16:
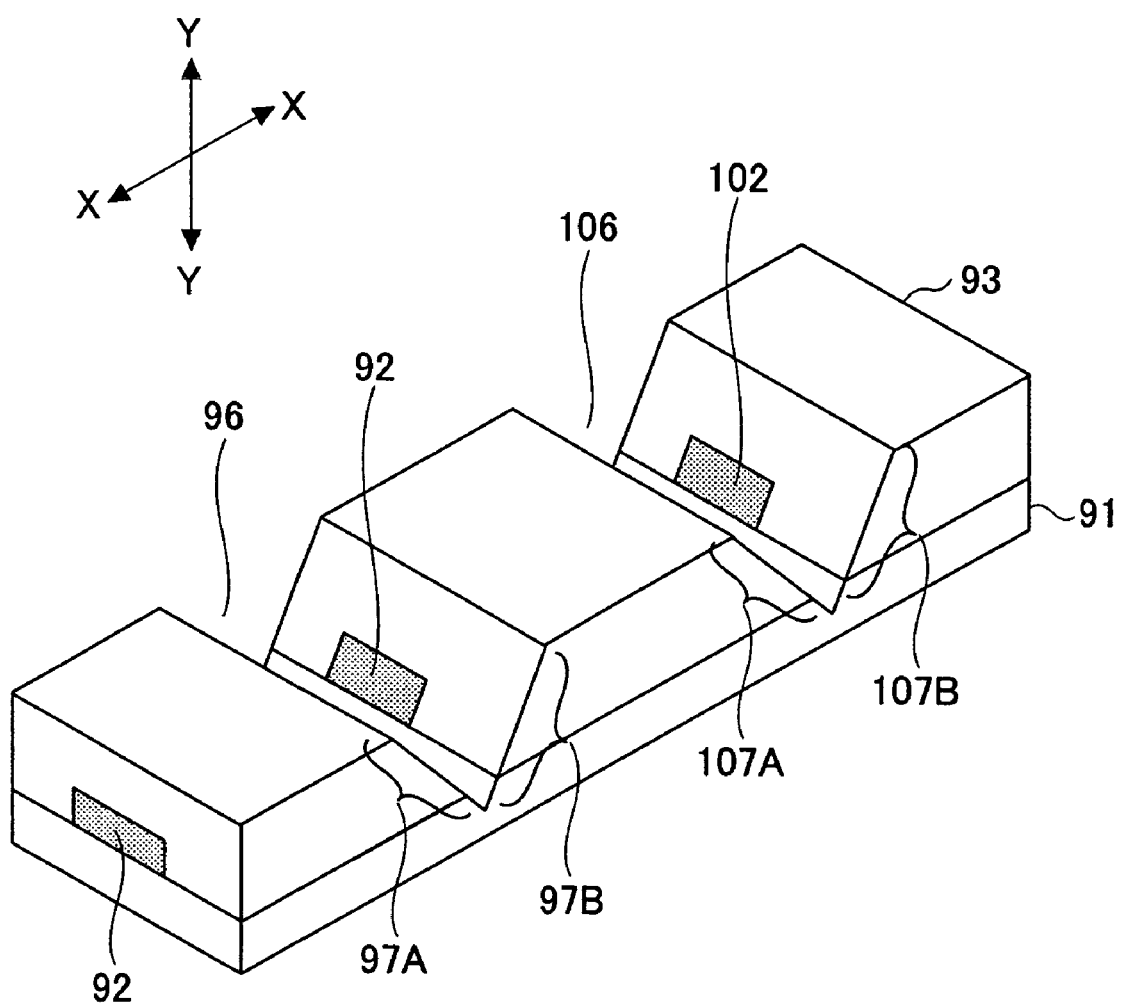
FIG. 16 is a perspective diagram of the lower clad layer, the core section, and an upper clad layer after forming slots by the process shown in FIG. 11.

Next, with reference to FIG. 9 through FIG. 16, the manufacturing method of the optical waveguide 90 of the first embodiment is described. FIG. 9 through FIG. 15 show the manufacturing process of the optical waveguide of the first embodiment, and FIG. 16 is a perspective diagram showing the lower clad layer 91, the core section 92, and the upper clad layer 93 after the slot formation process shown in FIG. 11. In addition, in FIG. 9 through FIG. 16, the direction X—X is the longitudinal direction of the core section 92; the direction Y—Y is the direction perpendicular to the surfaces of the lower clad layer 91 and the upper clad layer 93. Further, in FIG. 9 through FIG. 16, the same reference marks are given to the same components as the optical module 70 shown in FIG. 8.

Figure 9:
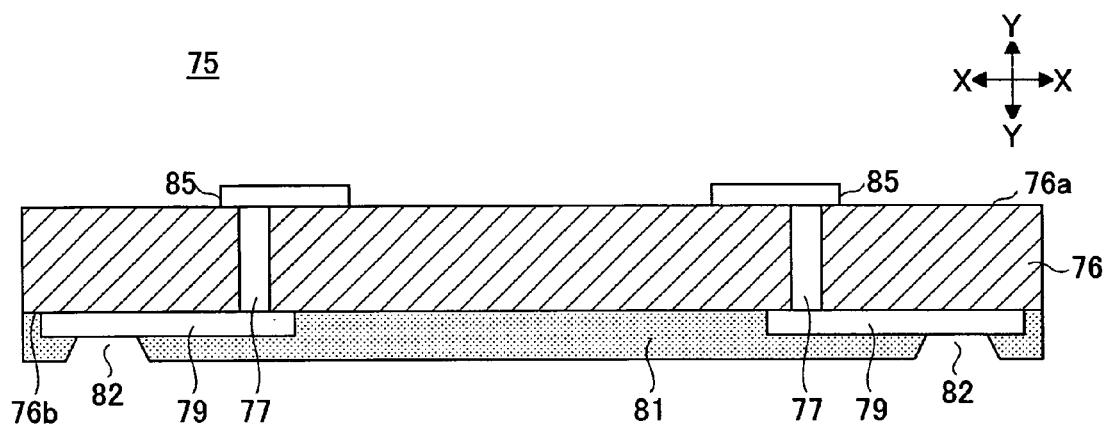
FIG. 9 is a cross-sectional view (No. 1) showing a manufacturing process of the optical waveguide of the first embodiment.
Figure 10:
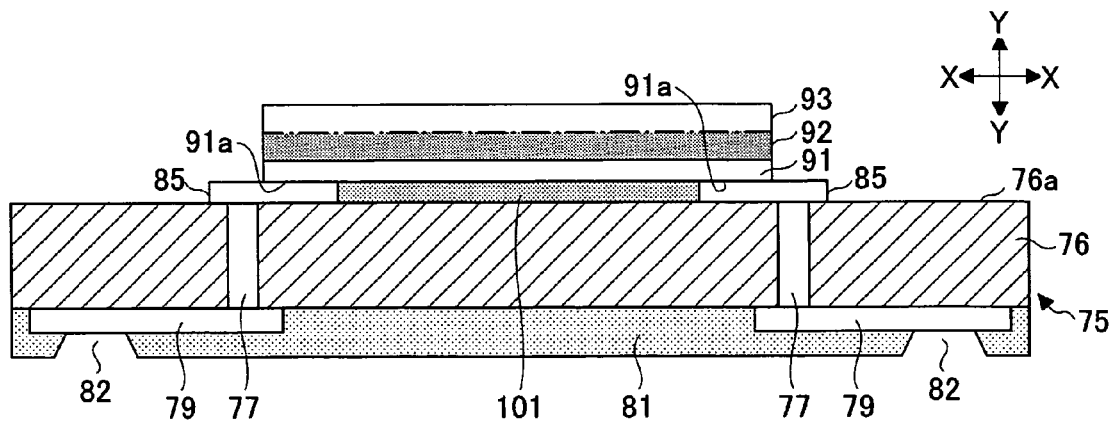
FIG. 10 is a cross-sectional view (No. 2) showing the manufacturing process of the optical waveguide of the first embodiment.

First, the substrate 75 as shown in FIG. 9 is produced by a conventional technique. Next, as shown in FIG. 10, the lower clad layer 91 is formed on the base material 76 so that the both ends of the surface 91a of the lower clad layer 91 contact the upper wiring patterns 85, a space between the lower clad layer 91 and the base material 76 is filled up with the adhesives 101, and the lower clad layer 91 is pasted to the base material 76. Then, the core section 92 is formed on the lower clad layer 91, and then, the upper clad layer 93 is formed on the lower clad layer 91 so that the upper surface and sides of the core section 92 are covered (a clad layer and core section formation process). Thickness of the lower clad layer 91 can be set to 50 µm, and thickness of the core section 92 can be set to 50 µm, for example. Further, thickness of the upper clad layer 93 can be set to 50 µm, for example.

Figure 11:
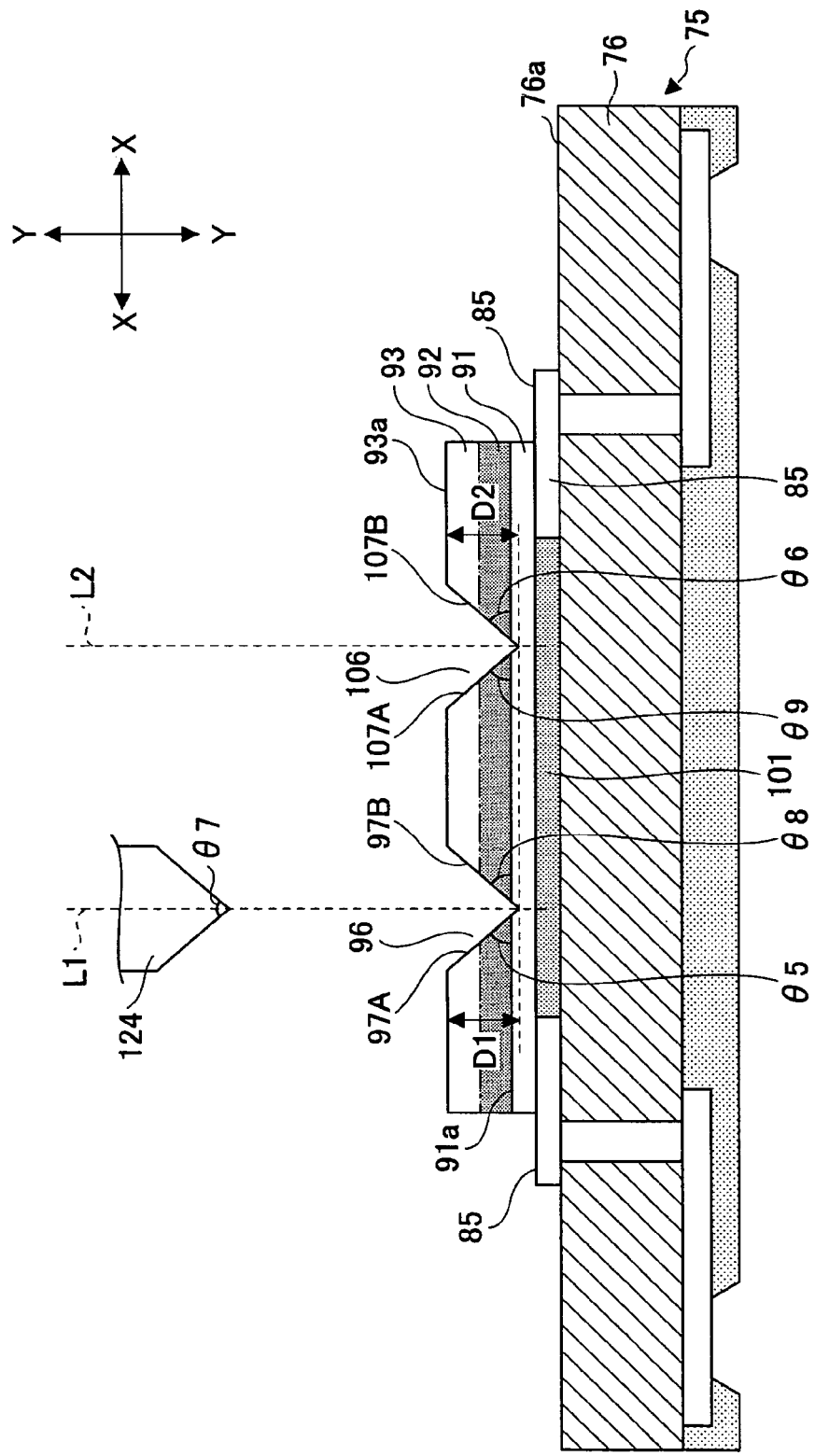
FIG. 11 is a cross-sectional view (No. 3) showing the manufacturing process of the optical waveguide of the first embodiment.

Next, as shown in FIG. 11, a blade 124 of a dicer (dicing equipment) makes contact from the side of the upper clad layer 93, and the first slot 96 having the inclined planes 97A and 97B, and the second slot 106 having the inclined planes 107A and 107B are formed one by one (slot formation process). The second slot 106 is formed in a position different from the first slot 96 in the X—X directions on the right-hand side in FIG. 11. An angle θ7 of the blade 124 of the dicer (dicing equipment) is set to 90°. The first slot 96 is formed by moving the blade 124 downward such that the move locus L1 of the blade 124 and the upper surface 93a of the upper clad layer 93 may perpendicularly intersect. Further, the second slot 126 is formed by moving the blade 124 downward such that the move locus L2 of the blade 124 and the upper surface 93a of the upper clad layer 93 may perpendicularly intersect. Here, the move loci L1 and L2 of the blade 124 are lines obtained by connecting moving positions of the blade 124.

The angle θ5 between the inclined plane 97A and the surface 91a of the lower clad layer 91, an angle θ8 between the plane 97B and the surface 91a of the lower clad layer 91, an angle θ9 between the inclined plane 107A and the surface 91a of the lower clad layer 91, and the angle θ6 between the inclined plane 107B and the surface 91a of the lower clad layer are made to be 45°. Further, the depth D1 of the first slot 96 (depth of the first slot 96 measured from the upper surface 93a of the upper clad layer) can be set to 125 µm, and the depth D2 of the second slot (depth of the second slot 106 measured from the upper surface 93a of the upper clad layer) can be set to 125 µm.

Figure 12:
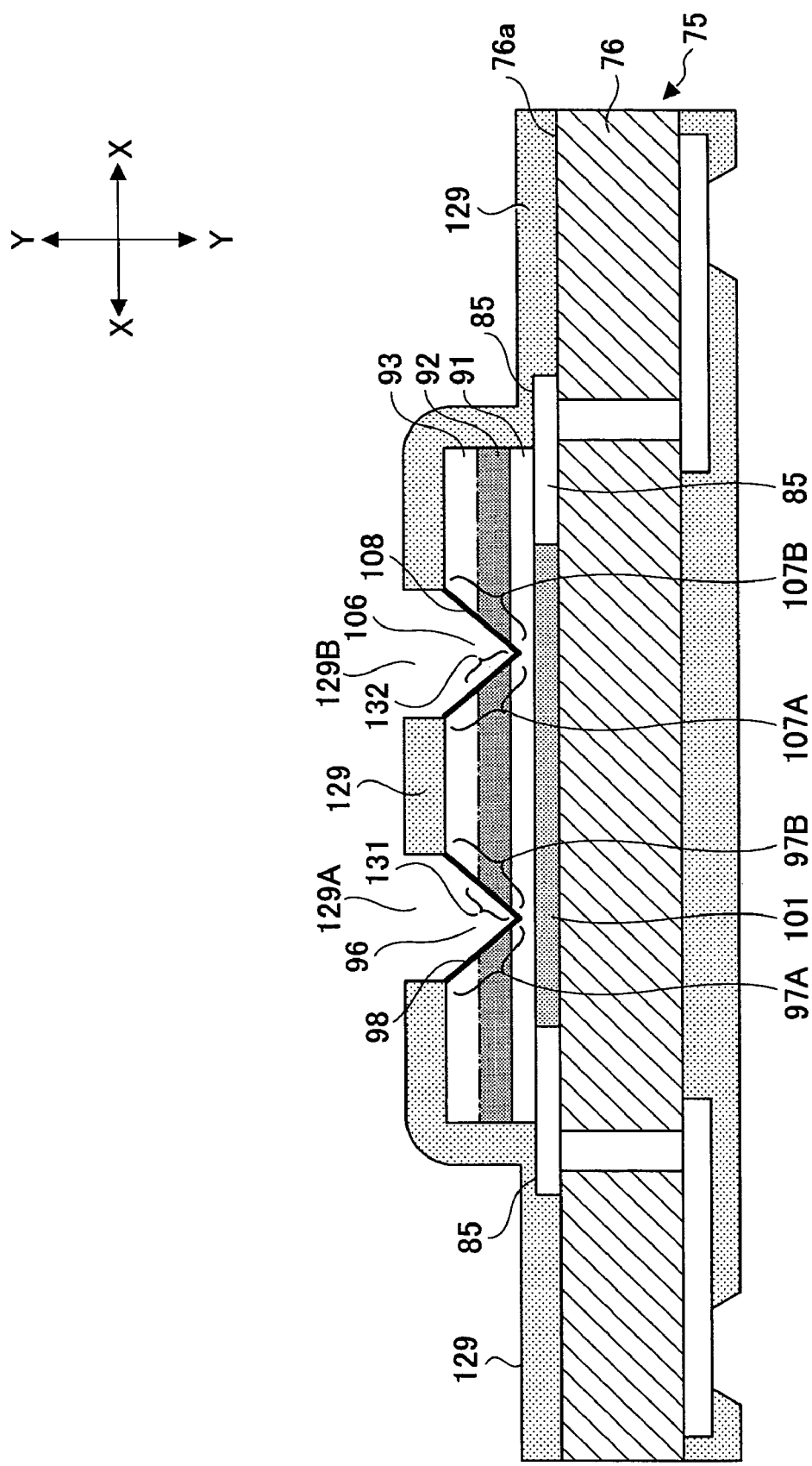
FIG. 12 is a cross-sectional view (No. 4) showing the manufacturing process of the optical waveguide of the first embodiment.

Then, with reference to FIG. 12, a solder resist 129 having an opening 129A for exposing the first slot 96 and an opening 129B for exposing the second slot 106 is formed on the upper clad layer 93, the upper wiring pattern 85, and the base material 76. Then, a metal film is formed in the first and second slots 96 and 106 such that the first mirror 98 is formed on the inclined plane 97A, and the second mirror 108 is formed on the inclined plane 107B (mirror formation process). As the metal film, an Au film formed by, for example, a vacuum deposition method can be used. The thickness of the metal film can be made, e.g., 1 µm or less, and preferably about 0.5 µm. Here, the metal film is formed also on the inclined planes 97B and 107A in the mirror formation process.

While a metal film 131 (first metal film) formed at the portion corresponding to the core section 92 of the inclined plane 97B and a metal film 132 (second metal film) formed at the portion corresponding to the core section 92 of the inclined plane 107A are present, the optical signal reflected by the first mirror 98 cannot be transmitted to the second mirror 108 due to the metal films 131 and 132 being obstacles. Accordingly, it is necessary to remove the metal films 131 and 132 such that an optical path is obtained.

Figure 13:
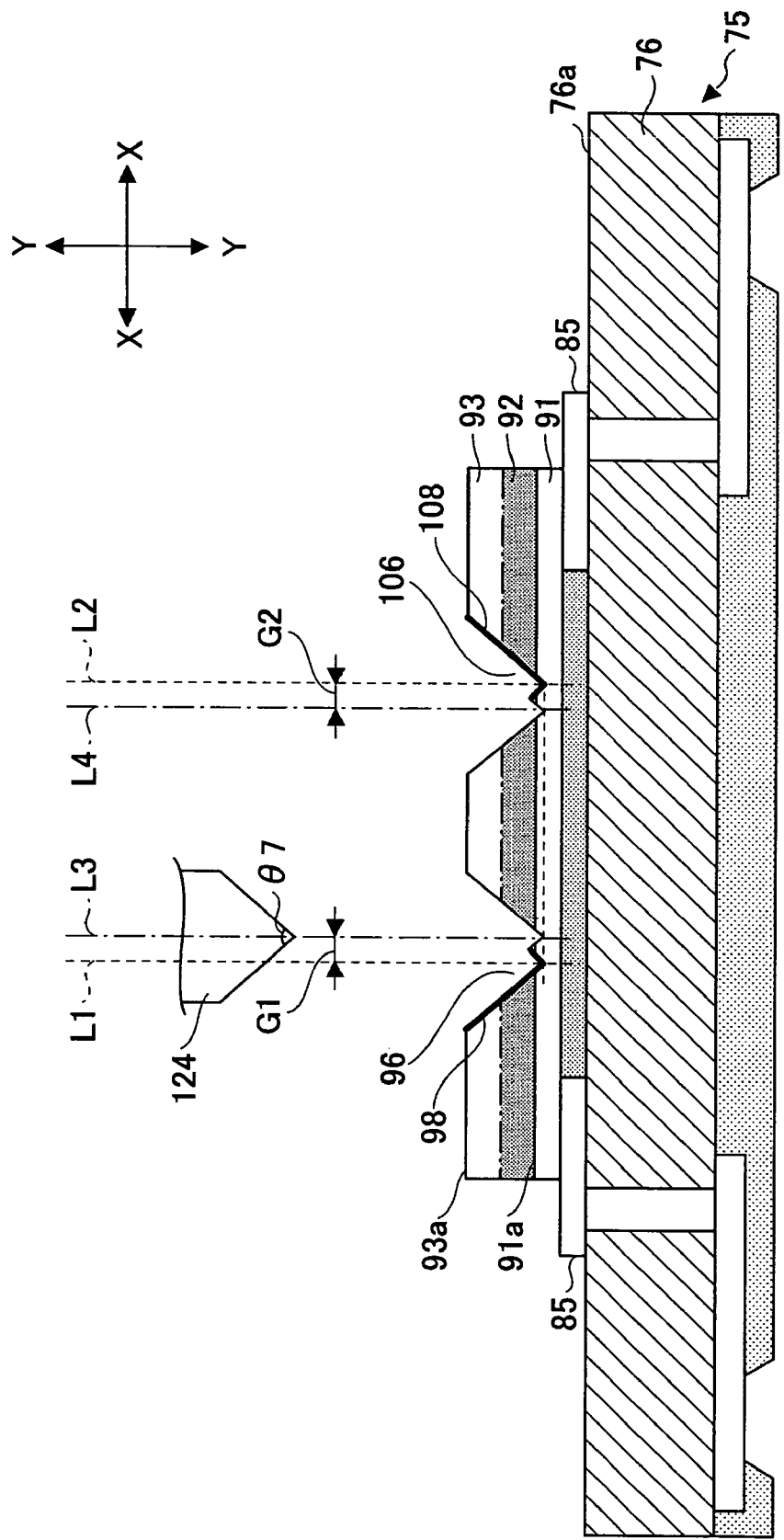
FIG. 13 is a cross-sectional view (No. 5) showing the manufacturing process of the optical waveguide of the first embodiment.

Next, as shown in FIG. 13, the metal films 131 and 132 are removed using the dicer (dicing equipment) (metal film removal process). Specifically, when removing the metal film 131 formed in first slot 96, the blade 124 is moved rightward in the X—X direction of FIG. 13 by a distance G1 with reference to the move locus L1, and the blade 124 is moved down such that its move locus L3 is apart from the move locus L1 by the distance G1, forming a move locus L3 that perpendicularly intersects the upper surface 93a of the upper clad layer 93. Then, the metal film 131 is removed by grinding. At this time, metal films other than the metal film 131 formed on the inclined plane 97B may also be removed with the metal film 131. The distance G1 can be set as about 2–3 µm. The amount of grinding by the dicer (dicing equipment) is set such that the metal film 131 is removed. Here, the metal film other than the metal film 131 may remain on the inclined plane 97B.

When removing the metal film 132 formed in the second slot 106, the blade 124 of the dicer (dicing equipment) is shifted leftward in the X—X directions of FIG. 13 by a distance G2 with reference to the move locus L2, and its move locus is as shown by L4, the move locus L4 perpendicularly intersecting the upper surface 93a of the upper clad layer 93. Then, the metal film 132 is removed by grinding. At this time, a metal film other than metal film 132 formed on the inclined plane 107A may also be removed with the metal film 132. The distance G2 can be set as about 2–3 µm. The amount of grinding by the dicer (dicing equipment) is set such that the metal film 131 is removed. In addition, the metal film other than metal film 132 may remain on the inclined plane 107A. Furthermore, the metal films 131 and 132 may be removed using equipment other than the dicer (dicing equipment), for example, a laser. Further, the move loci L3 and L4 are lines obtained by connecting moving positions of the blade 124.

By removing the metal films 131 and 132 located between the first mirror 98 and the second mirror 108 in this way, the optical signal reflected by the first mirror 98 can be transmitted to the second mirror 108.

Next, as shown in FIG. 14, the first slot 96 where the first mirror 98 is formed and the second slot 106 where the second mirror 108 is formed are filled up with the core material 99, and then the upper surface 99a of the core material 99 and the surface 93a of the upper clad layer 93 are made even (to the same level) (core material filling process). The core material 99 is the same as the material of the core section 92.

As described, the first slot 96 where the first mirror 98 is formed and the second slot 106 where the second mirror 108 is formed are filled up with the same core material 99 as the material of the core section 92. In this way, the first and second mirrors 98 and 108 are placed in contact with the core material 99, and the attenuation of the optical signal immediately after being reflected by the first and second mirrors 98 and 108 can be reduced. Further, the refractive index of the optical path through which the optical signal between the first mirror 98 and the second mirror 108 is transmitted can be made the same as the refractive index of the core section 92.

Next, as shown in FIG. 15, the penetration vias 95A and 95B are formed, which are connected to the corresponding upper wiring patterns 85 penetrating the upper clad layer 93, the core section 92, and the lower clad layer 91. Then, the device connection wiring pattern 110 is formed on the surface 93a of the upper clad layer 93, the surface 99a of the core material 99, and the penetration vias 95A and 95B. Then, the solder resist 111 having the openings 112 and 113, the optical entrance 115, and the optical exit 116 is formed so that the upper clad layer 93, the core material 99, and the device connection wiring pattern 110 are covered. As described above, the optical waveguide 90 of this embodiment is manufactured in one body with the substrate 75. In addition, the penetration vias 95A and 95B, the device connection wiring pattern 110, and the solder resist 111 can be formed by conventional techniques.

As described above, the lower clad layer 91, the core section 92, and the upper clad layer 93 are formed one by one on the substrate 75. The first and second slots 96 and 106 that divide the core section 92 are formed from the side of the upper clad layer 93 that is not connected to the substrate 75. Then, a metal film is formed in the first and second slots 96 and 106, and the first and second mirrors 98 and 108 are formed. In this way, the manufacturing process of the substrate and the manufacturing process of the optical waveguide do not have to be separated, which processes are separated according to the conventional manufacturing process, and the optical waveguide 90 is formed in one body with the substrate 75 as a part of the manufacturing process of the substrate 75 according to the present invention.

Figure 17:
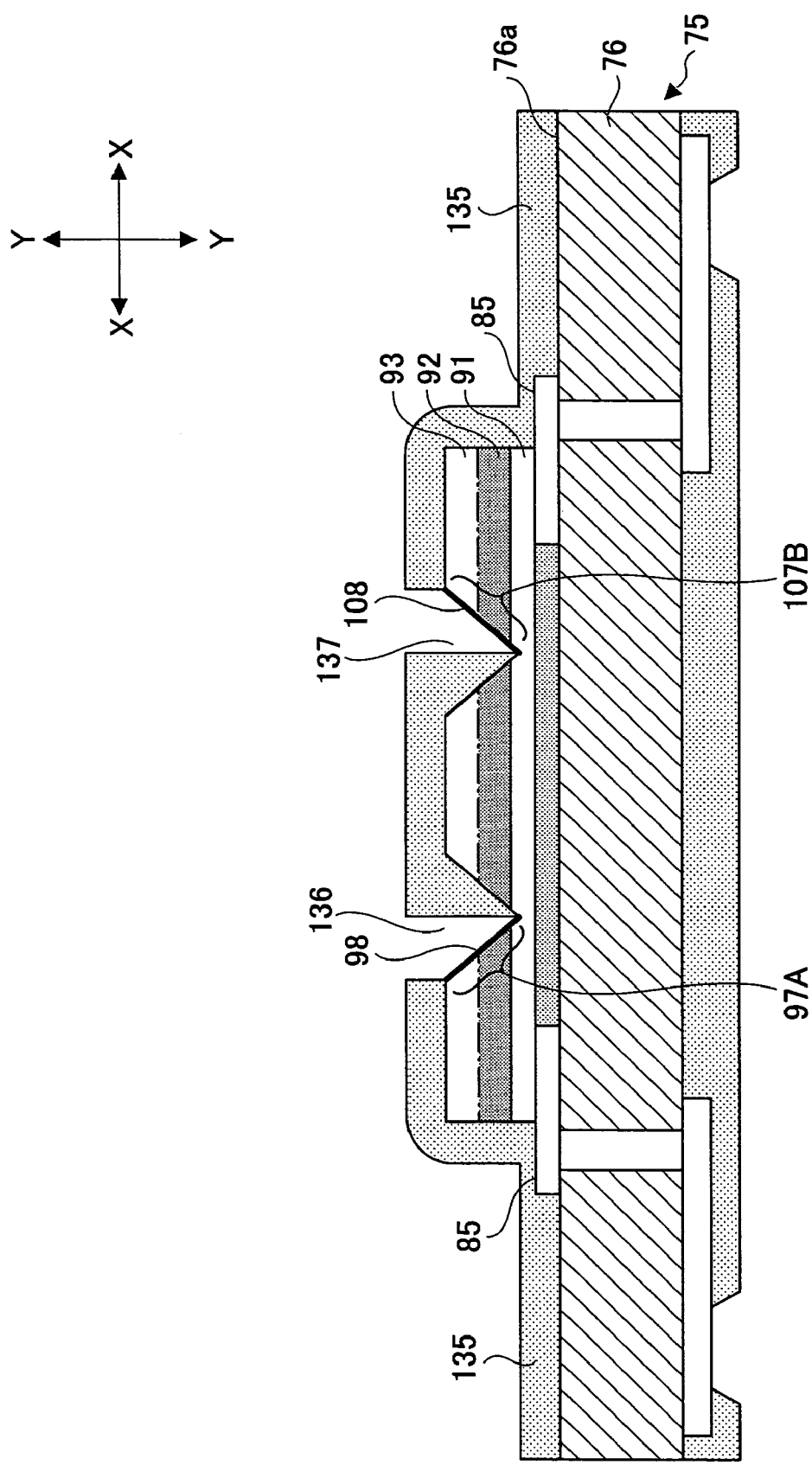
FIG. 17 is a cross-sectional view showing a modification of the manufacturing process of the optical waveguide of the first embodiment.

FIG. 17 shows a modification of the manufacturing process of the optical waveguide of the first embodiment. In FIG. 17, the same reference marks are given to the same components as the optical module 70 shown in FIG. 8. As shown in FIG. 17, a solder resist 135 having an opening 136 for exposing the inclined plane 97A where the first mirror 98 is formed, and an opening 137 for exposing the inclined plane 107B where the second mirror 108 is formed is formed after the slot formation process shown in FIG. 11. Then, a metal film is deposited on the inclined planes 97A and 107B through the openings 136 and 137 such that the first mirror 98 is formed on the inclined plane 97A, and the second mirror 108 is formed on the inclined plane 107B. By forming the first and second mirrors 98 and 108 in this way, the metal film removal process shown in FIG. 13 can be dispensed with, and the manufacturing process of the optical waveguide can be simplified.

(The Second Embodiment)

Figure 18:
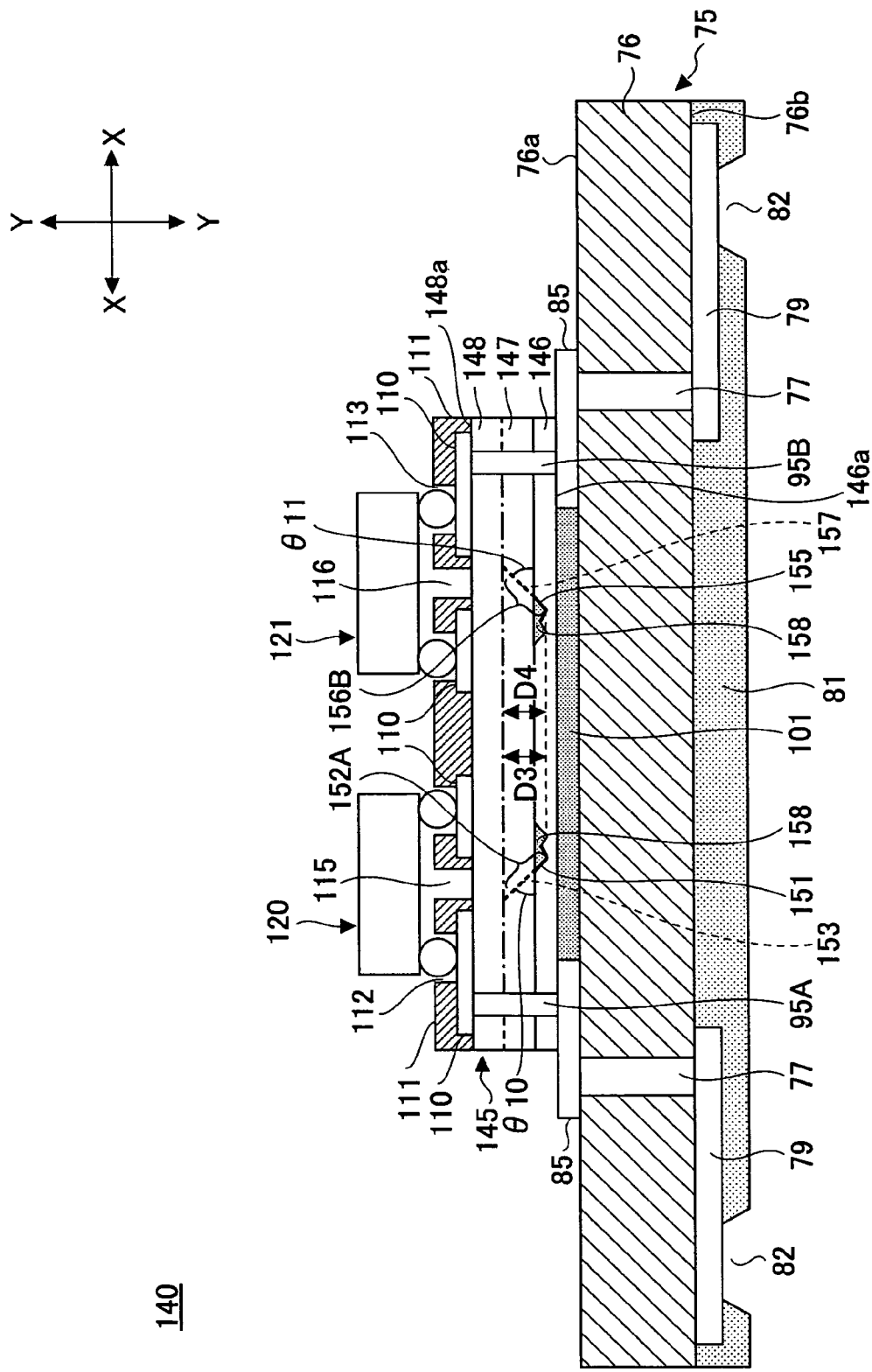
FIG. 18 is a cross-sectional view of the optical module according to the second embodiment of the present invention.

With reference to FIG. 18, an optical module 140 according to the second embodiment of the present invention is described. FIG. 18 is a cross-sectional view of the optical module 140. Here in FIG. 18, the same reference marks are given to the same components as the optical module 70 shown in FIG. 8. Further, in FIG. 18, the direction X—X is the longitudinal direction of a core section 147; and the direction Y—Y is the direction perpendicular to the surfaces of a lower clad layer 146 and an upper clad layer 148.

The optical module 140 includes the substrate 75, an optical waveguide 145, the luminous source 120, and the optical receiver 121. That is, the optical module 140 of the present embodiment has the optical waveguide 145 that is different from the optical waveguide 90 of the optical module 70 according to the first embodiment. Here, major differences between the optical waveguide 90 and the optical waveguide 145 are described.

The optical waveguide 145 is adhered to the substrate 75 by the adhesives 101 provided between the lower clad layer 146 and the base material 76. The optical waveguide 145 includes the lower clad layer 146, the core section 147, the upper clad layer 148, the penetration vias 95A and 95B, a first slot 151, a second slot 155, a first mirror 153, a second mirror 157, a core material 158, the device connection wiring pattern 110, and the solder resist 111.

The lower clad layer 146 that is the first clad layer is formed on the two upper wiring patterns 85 shown in FIG. 18, and is connected to the base material 76 through the adhesives 101. The core section 147, equipped with the first and second mirrors 153 and 157, is formed on the lower clad layer 146. The core section 147 is for transmitting the optical signal. The core material of the core section 147 is set up so that its refractive index may become greater than that of the clad material of the lower clad layer 146 and the upper clad layer 148. The upper clad layer 148 that is the second clad layer is formed on the lower clad layer 146 so that the upper surface and the sides of the core section 147 may be covered. In addition, the thickness of the upper clad layer 148 can be set to 50 μm, and the thickness of the core section 147 can be set to 50 μm. Further, the thickness of the lower clad layer 146 can be set to 50 μm The first and second slots 151 and 155 divide the core section 147, and are formed to the inside of the penetration vias 95A and 95B, respectively, as shown in FIG. 18. The first slot 151 is formed near the penetration via 95A, and the second slot 155 is formed near the penetration via 95B.

The first slot 151 has an inclined plane 152A on the side of the penetration via 95A, and the inclined plane 152A is formed penetrating the core section 147 and the lower clad layer 146. Further, an angle θ10 between the inclined plane 152A and the undersurface 146a of the lower clad layer 146 is made to be 45°. The second slot 155 has an inclined plane 156B on the side of the penetration via 95B, and the inclined plane 156B is formed penetrating the core section 147 and the lower clad layer 146. Further, an angle θ11 between the inclined plane 156B and the undersurface 146a of the lower clad layer 146 is made to be 45°. Further, where the thickness of the lower clad layer 146 is set to 50 μm, the thickness of the upper clad layer 148 is set to 50 μm, and the thickness of the core section 147 is set to 50 µm, a depth D3 of the first slot 151 and a depth D4 of the second slot 155 can be set to 75 µm.

The first mirror 153 is formed on the inclined plane 152A. The first mirror 153 is for reflecting the optical signal from the luminous source 120 into the core section 147. The second mirror 157 is formed on the inclined plane 156B. The second mirror 157 is for reflecting the optical signal transmitted by the core section 147 in the direction to the optical receiver 121, upward in FIG. 18. As the first and second mirrors 153 and 157, Au films, for example, formed by the vacuum deposition method can be used. In this case, the thickness of Au films can be set to 1 µm or less, preferably about 0.5 µm.

The core material 158 is used to fill up the first slot 151 where the first mirror 153 is formed and the second slot 155 where the second mirror 157 is formed. The core material 158 is the same as the material of the core section 147.

As described, since the first slot 151 where the first mirror 153 is formed and the second slot 155 where the second mirror 157 is formed are filled up with the same core material 158 as the material of the core section 147, the first and second mirrors 153 and 157 contact the core material 158, and attenuation of the optical signal immediately after being reflected by the first and second mirrors 153 and 157 can be reduced. Further, the refractive index of the optical path through which the optical signal is transmitted between the first mirror 153 and the second mirror 157 can be made the same as the core section 147.

Figure 27:
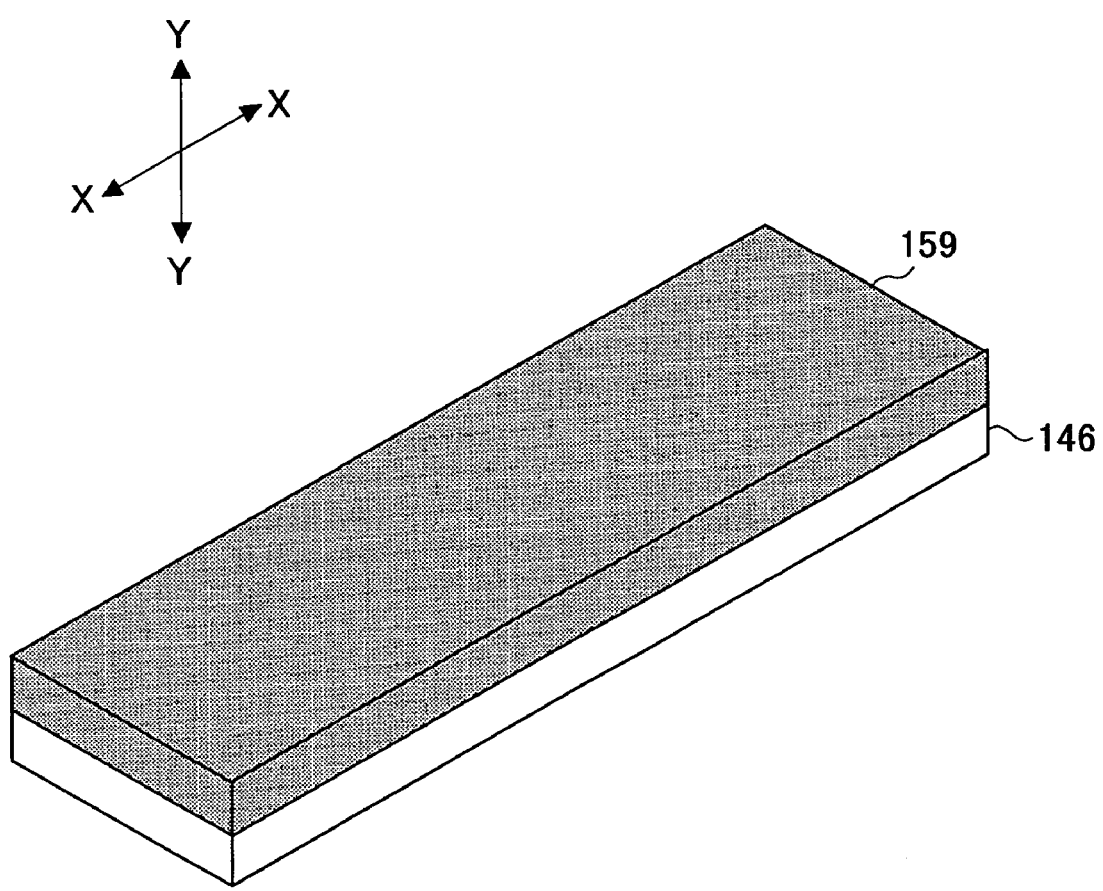
FIG. 27 is a perspective diagram of a lower clad layer and a core layer shown in FIG. 19.
Figure 28:
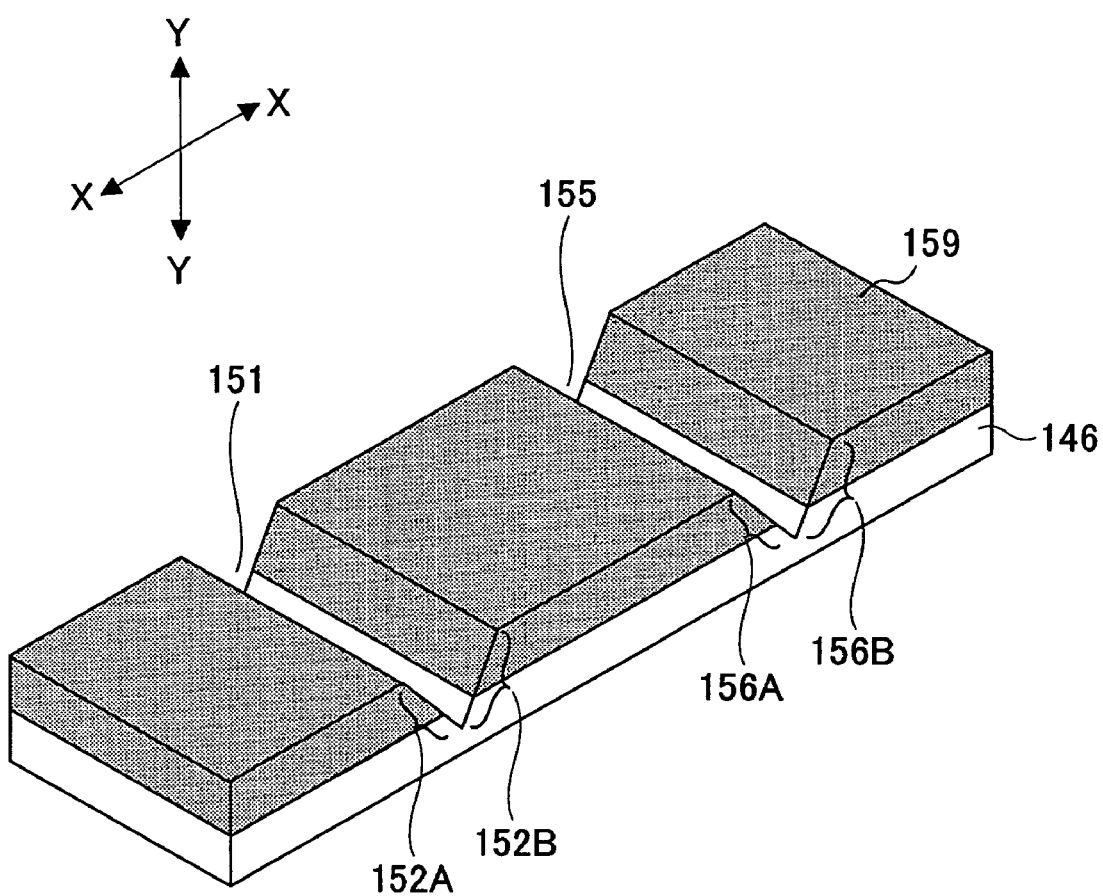
FIG. 28 is a perspective diagram of the lower clad layer and the core layer after the slot formation process shown in FIG. 20.
Figure 29:
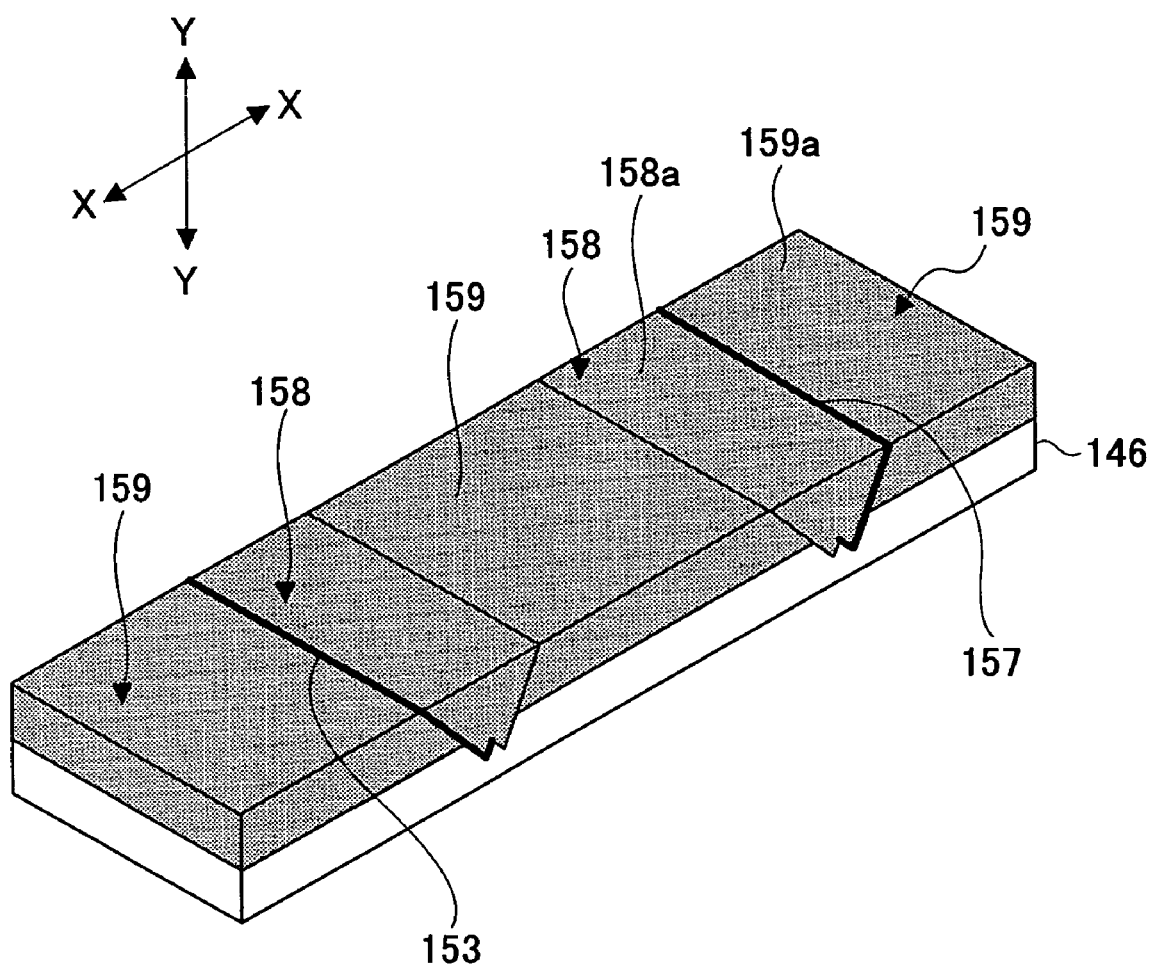
FIG. 29 is a perspective diagram of the lower clad layer and the core layer after the core material filling process shown in FIG. 23.
Figure 30:
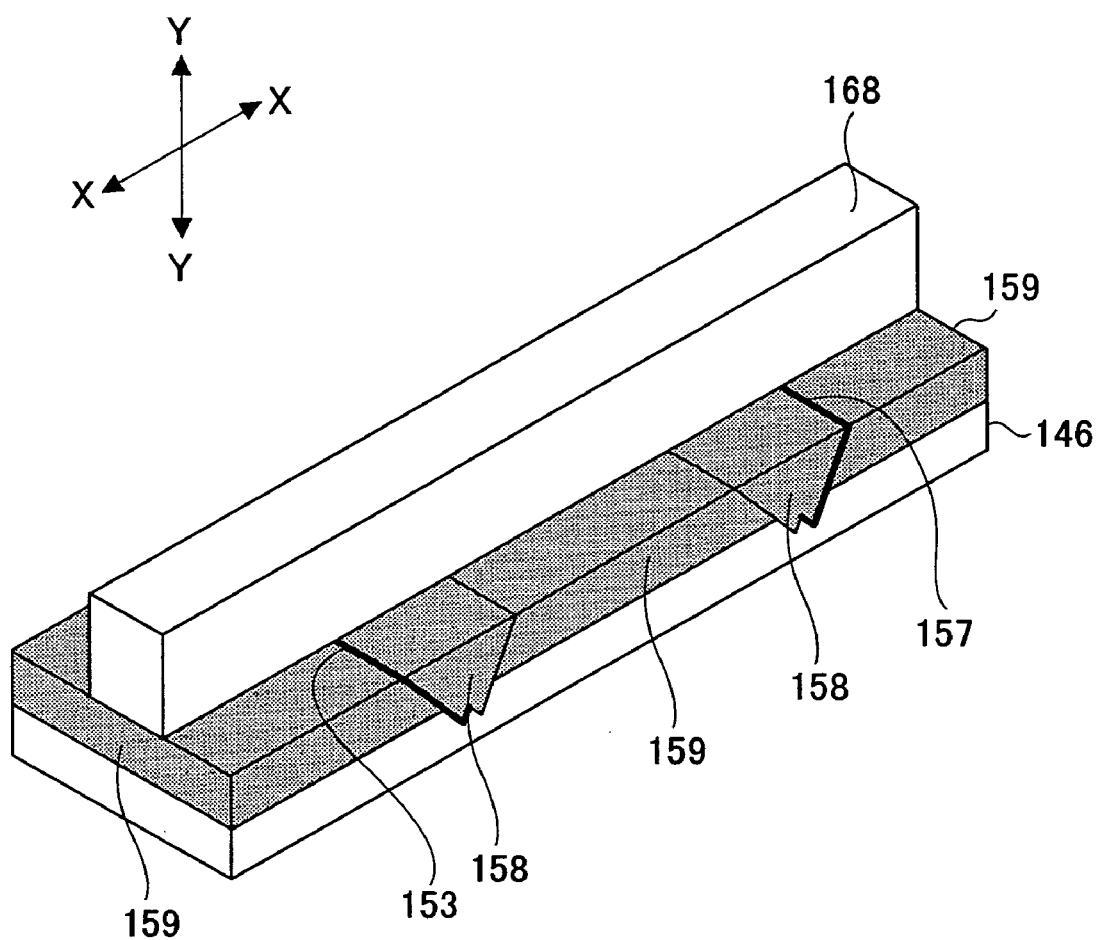
FIG. 30 is a perspective diagram of the lower clad layer and the core layer after the resist layer formation shown in FIG. 24.
Figure 31:
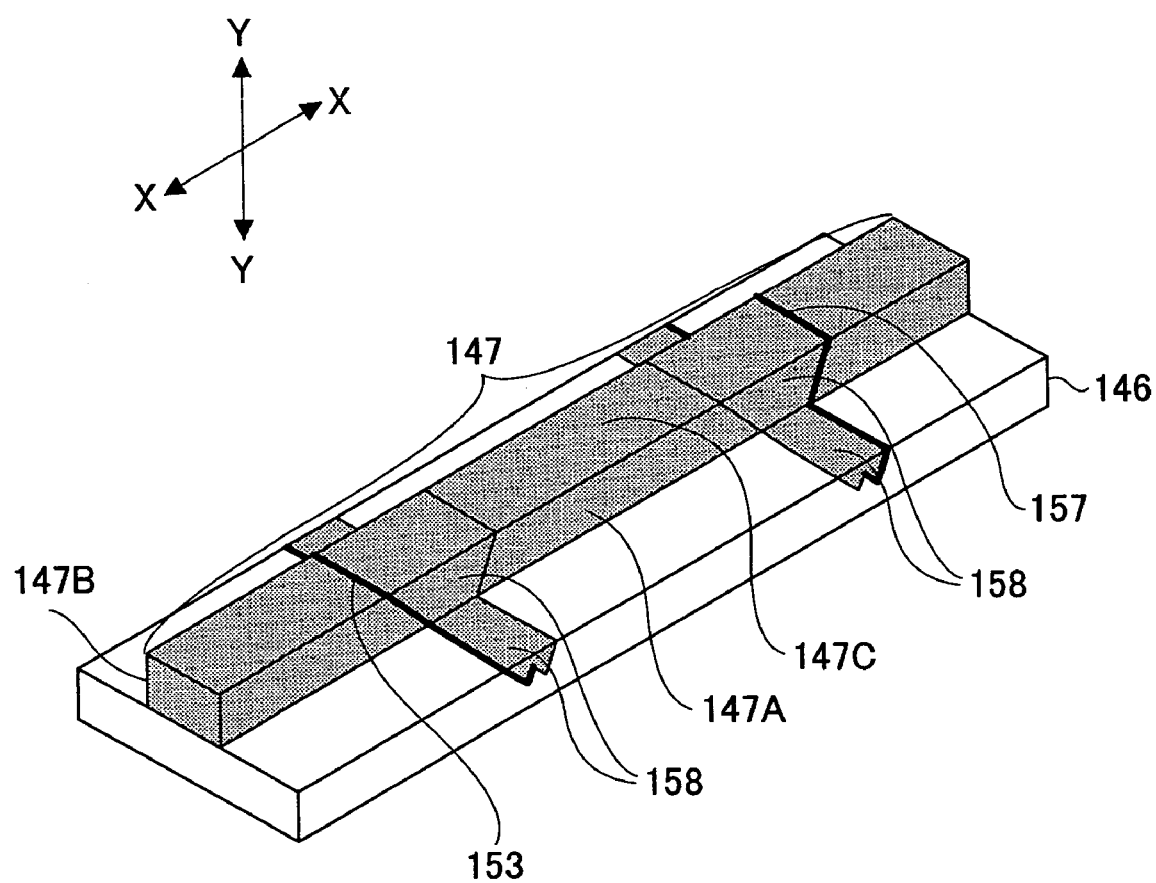
FIG. 31 is a perspective diagram of the core section and the lower clad layer after the core section formation process.
Figure 32:
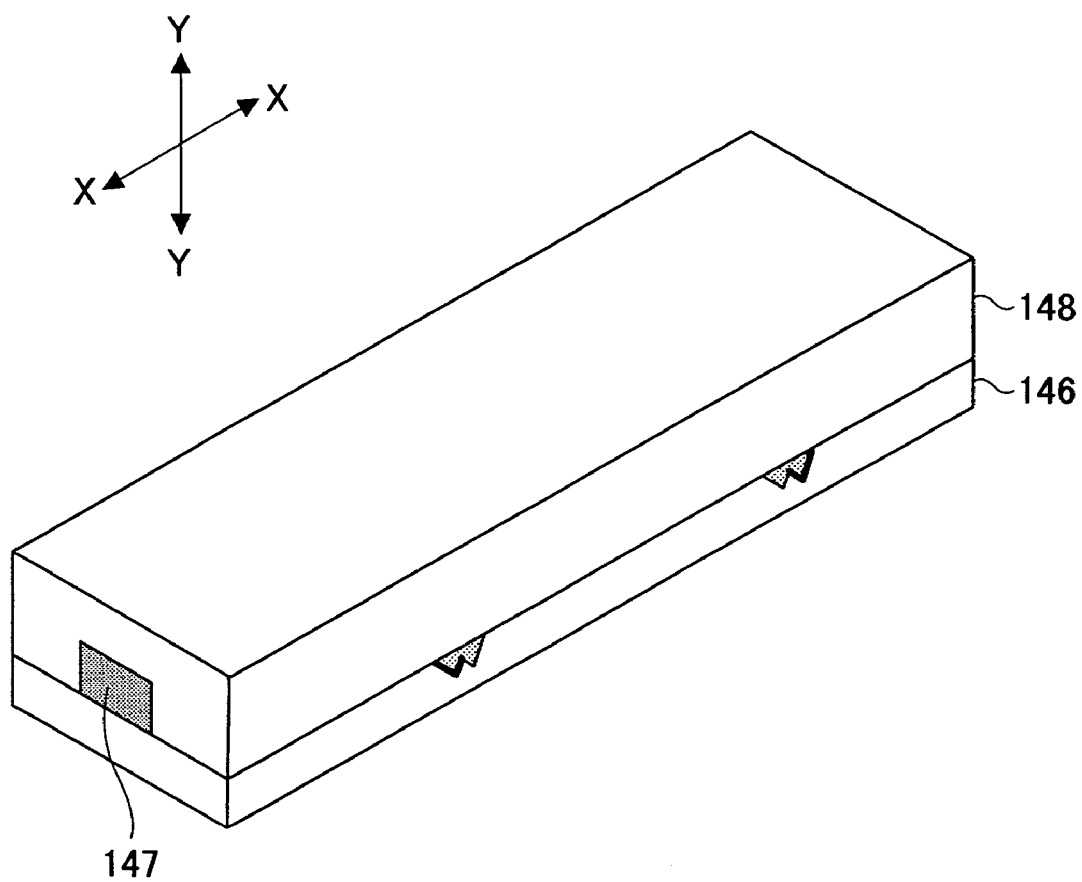
FIG. 32 is a perspective diagram of the upper clad layer, the core section, and the lower clad layer.

Next, the manufacturing method of the optical waveguide 145 of the second embodiment is described with reference to FIGS. 19 through 32. The manufacturing process of the optical waveguide of the second embodiment is shown in FIGS. 19 through 26. FIG. 27 is a perspective diagram of the lower clad layer and the core layer shown in FIG. 19. FIG. 28 is a perspective diagram of the lower clad layer and the core layer after the slot formation process shown in FIG. 20. FIG. 29 is a perspective diagram of the lower clad layer and the core layer after the core material filling process shown in FIG. 23. Further, FIG. 30 is a perspective diagram of the lower clad layer and a core layer after the resist layer formation shown in FIG. 24. FIG. 31 is a perspective diagram of the lower clad layer and the core section after the core section formation process. FIG. 32 is a perspective diagram of the upper clad layer, the core section, and the lower clad layer. Here, in FIGS. 19 through 32, the direction X—X is the longitudinal direction of the core section 147; and the direction Y—Y is the direction that is perpendicular to the surface of the lower clad layer 146 and the upper clad layer 148. Further, in FIG. 19 through FIG. 32, the same reference marks are given to the same components as the optical module 140 shown in FIG. 18.

Figure 19:
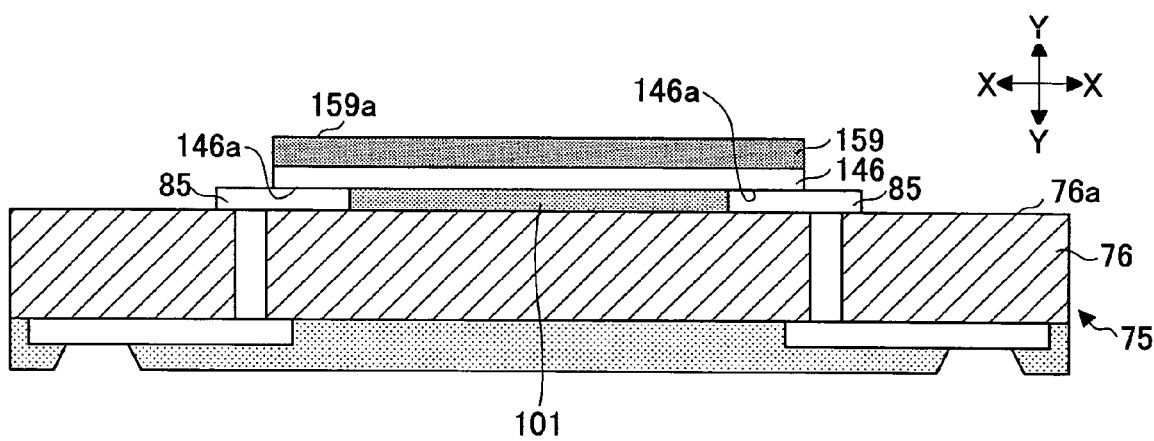
FIG. 19 is a cross-sectional view (No. 1) showing the manufacturing process of the optical waveguide of the second embodiment.

First, as shown in FIG. 19, the lower clad layer 146 is formed so that the both ends of the undersurface 146a of the lower clad layer 146 that is the first clad layer may contact the upper wiring pattern 85, the crevice between the lower clad layer 146 and the base material 76 is filled up with the adhesives 101, and the lower clad layer 146 is pasted to the substrate 75 (first clad layer formation process). Thickness of the lower clad layer 146 can be set to, e.g., 50 µm. Then, the core layer 159 serving as the base material of the core section 147 is formed on the lower clad layer 146 (core layer formation process). Thickness of the core layer 159 can be set to 50 µm.

Figure 20:
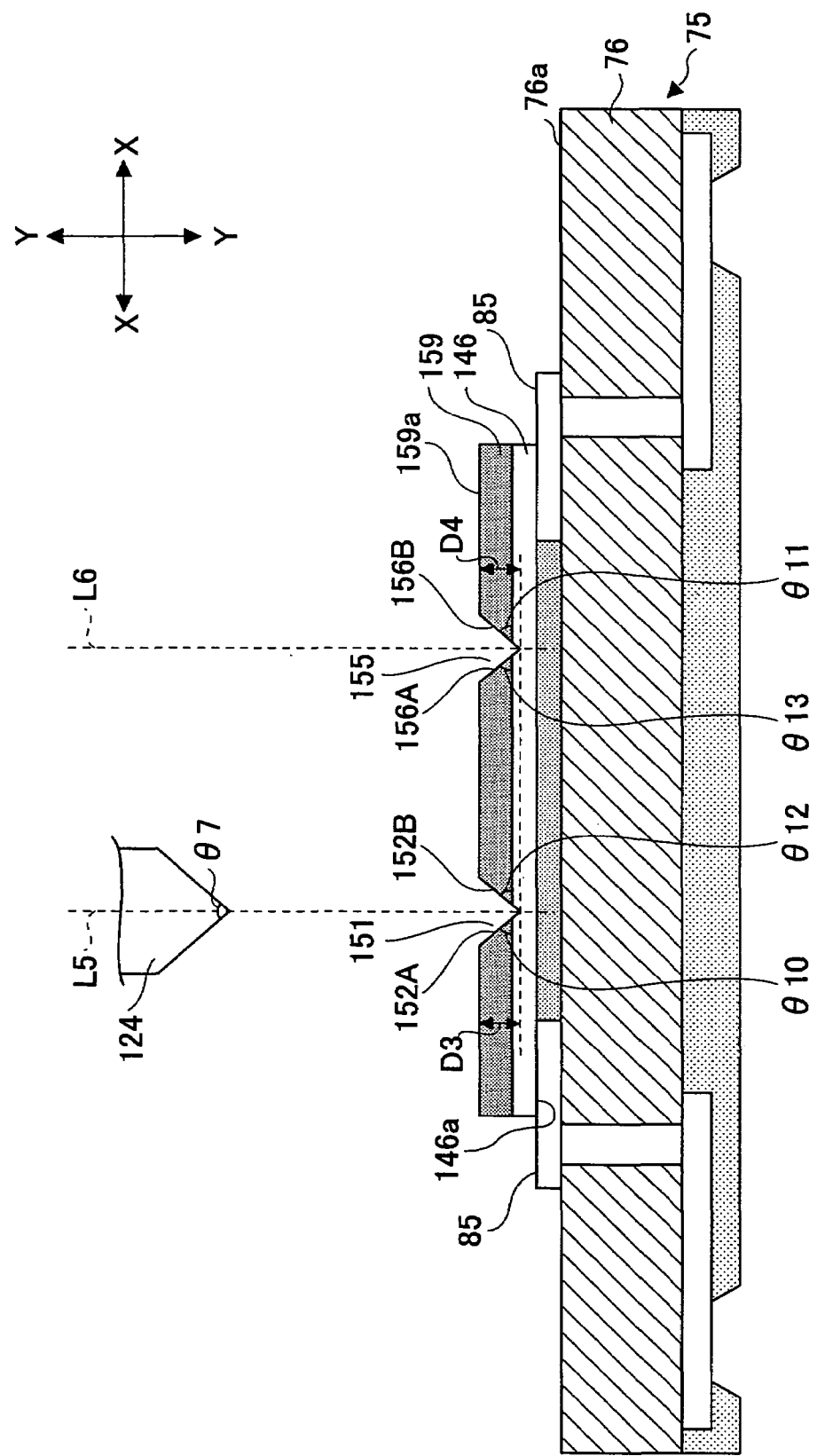
FIG. 20 is a cross-sectional view (No. 2) showing the manufacturing process of the optical waveguide of the second embodiment.

Next, as shown in FIG. 20, the blade 124 of the dicer (dicing equipment) makes contact with the core layer 159, and the first slot 151 with the inclined planes 152A and 152B and the second slot 155 with the inclined planes 156A and 156B are formed one by one (slot formation process). The second slot 155 is formed in the position apart from the first slot 151 in the X—X direction (to the right-hand side in FIG. 20). The blade 124 has an angle θ7 that is set to 90°. The first slot 151 is formed by the blade 124 moving downward so that a move locus L5 of the blade 124 perpendicularly intersects the upper surface 159a of the core layer 159. Further, the second slot 155 is formed by the blade 124 moving downward so that a move locus L6 of the blade 124 perpendicularly intersects the upper surface 159a of the core layer 159. Here, the move loci L5 and L6 of the blade are obtained by connecting moving positions of the blade 124.

Further, an angle θ10 between the inclined plane 152A and the undersurface 146a of the lower clad layer 146, an angle θ12 between the inclined plane 152B and the undersurface 146a of the lower clad layer 146, an angle θ13 between the inclined plane 156A and the undersurface 146a of the lower clad layer 146, and an angle θ11 between the inclined plane 156B and the undersurface 146a of the lower clad layer 146 are made to be 45°. The depth D3 of the first slot 151 (depth from the upper surface 159a of the core layer 159) can be set to 75 µm. Further, the depth D4 of the second slot 155 (depth from the upper surface 159a of the core layer 159) can be set to 75 µm.

Figure 21:
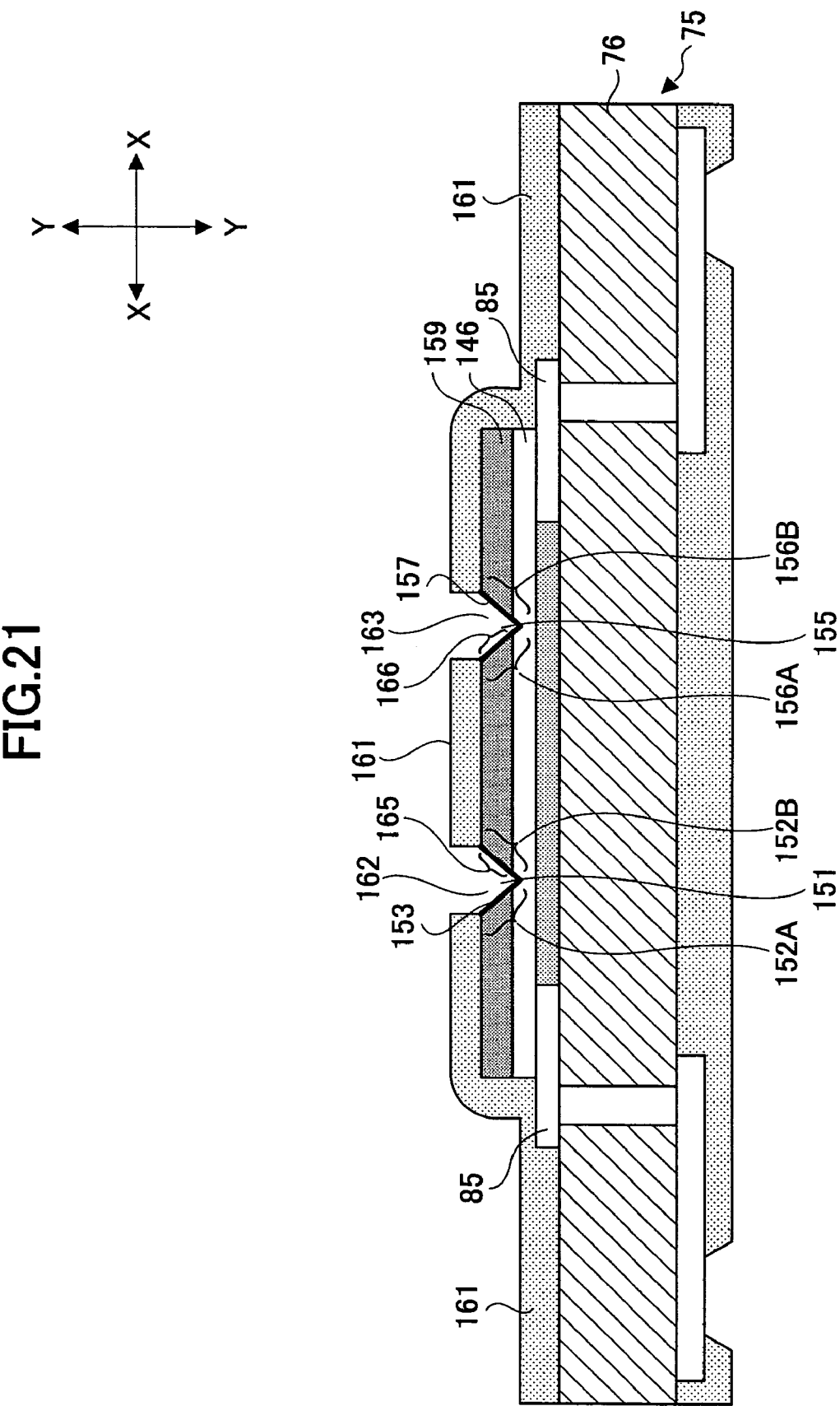
FIG. 21 is a cross-sectional view (No. 3) showing the manufacturing process of the optical waveguide of the second embodiment.

Next, as shown in FIG. 21, the solder resist 161 having the opening 162 for exposing the first slot 151 and the opening 163 for exposing the second slot 155 is formed on the core layer 159, the upper wiring pattern 85 and the base material 76. Then, a metal film is formed in the first and second slots 151 and 155 such that the first mirror 153 is formed on the inclined plane 152A and the second mirror 157 is formed on the inclined plane 156B (mirror formation process). As the metal film, an Au film, for example, formed by the vacuum deposition method can be used. Thickness of the Au film can be set to 1 µm or less, preferably about 0.5 µm, for example. Here, the metal film is formed also to the inclined planes 152B and 156A when performing the mirror formation process. That is, a metal film 165 (first metal film) shown in FIG. 21 is the metal film prepared in the portion that serves as the core section 147 among the metal films prepared on the inclined plane 152B, and a metal film 166 (second metal film) is the metal film prepared in the portion that serves as the core section 147 among the metal films prepared on the inclined plane 156A.

As shown in FIG. 21, the metal films 165 and 166 are formed in the optical path through which the optical signal between the first mirror 153 and the second mirror 157 is to be transmitted, that is, the metal films 165 and 166 are obstacles to the optical signal reflected by, the first mirror 153 to be transmitted to the second mirror 157. Accordingly, the metal films 165 and 166 prepared in the portion corresponding to the core section 147 have to be removed such that the optical path for the optical signal is obtained, and the optical signal reflected by the first mirror 153 can be transmitted to the second mirror 157.

Figure 22:
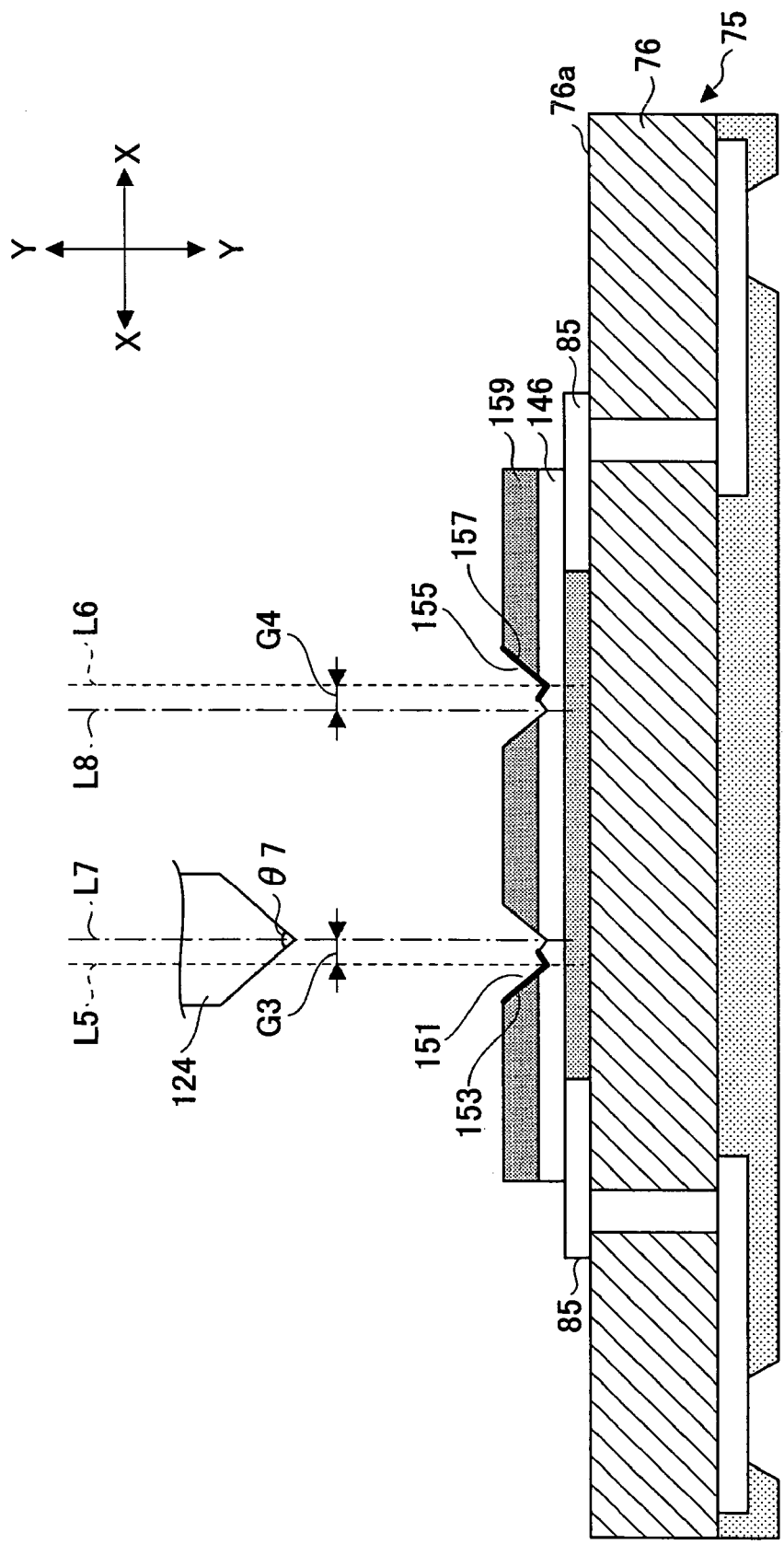
FIG. 22 is a cross-sectional view (No. 4) showing the manufacturing process of the optical waveguide of the second embodiment.

Next, as shown in FIG. 22, the metal films 165 and 166 prepared in the portion corresponding to the core section 147 are removed using the dicer (dicing equipment) (metal film removal process). Specifically, the metal film 165 formed in the first slot 151 is removed by moving the blade 124 of the dicer (dicing equipment) downward at a position in the X—X direction to the right in FIG. 22 with reference to the move locus L5 when processing the first slot 151 by a distance G3, forming a move locus L7 that perpendicularly intersect the upper surface 159a of the core layer 159. Then, the metal film 165 is removed by grinding. At this time, a metal film other than the metal film 165 formed on the inclined plane 152B is also removed with the metal film 165. The distance G3 can be set to about 2–3 μm. The amount of grinding by the dicer (dicing equipment) is set such that the metal film 165 is removed. In addition, the metal film other than the metal film 165 may remain on the inclined plane 152B.

The metal film 166 formed in the second slot 155 is removed by the blade 124 moving downward at a position to the left in FIG. 22 in the X—X direction with reference to the move locus L6 when processing the second slot 155 by a distance G4, forming a move locus L8 that perpendicularly intersects the upper surface 159a of the core layer 159. Then, the metal film 166 is removed by grinding. At this time, a metal film other than the metal film 166 formed on the inclined plane 156A is also removed with the metal film 166. The distance G4 can be set to about 2–3 μm. The amount of grinding of the dicer (dicing equipment) is set such that the metal film 166 is removed. Here, the metal film other than the metal film 166 may remain on the inclined plane 156A. Furthermore, the metal films 165 and 166 may be removed using equipment other than the dicer (dicing equipment), for example, a laser. Further, the move loci L7 and L8 of the blade 124 are obtained by connecting moving positions of the blade 124.

In this way, the optical signal reflected by the first mirror 153 can be transmitted to the second mirror 157 by removing the metal films 165 and 166 formed in the core section 147 located between the first mirror 153 and the second mirror 157.

Figure 23:
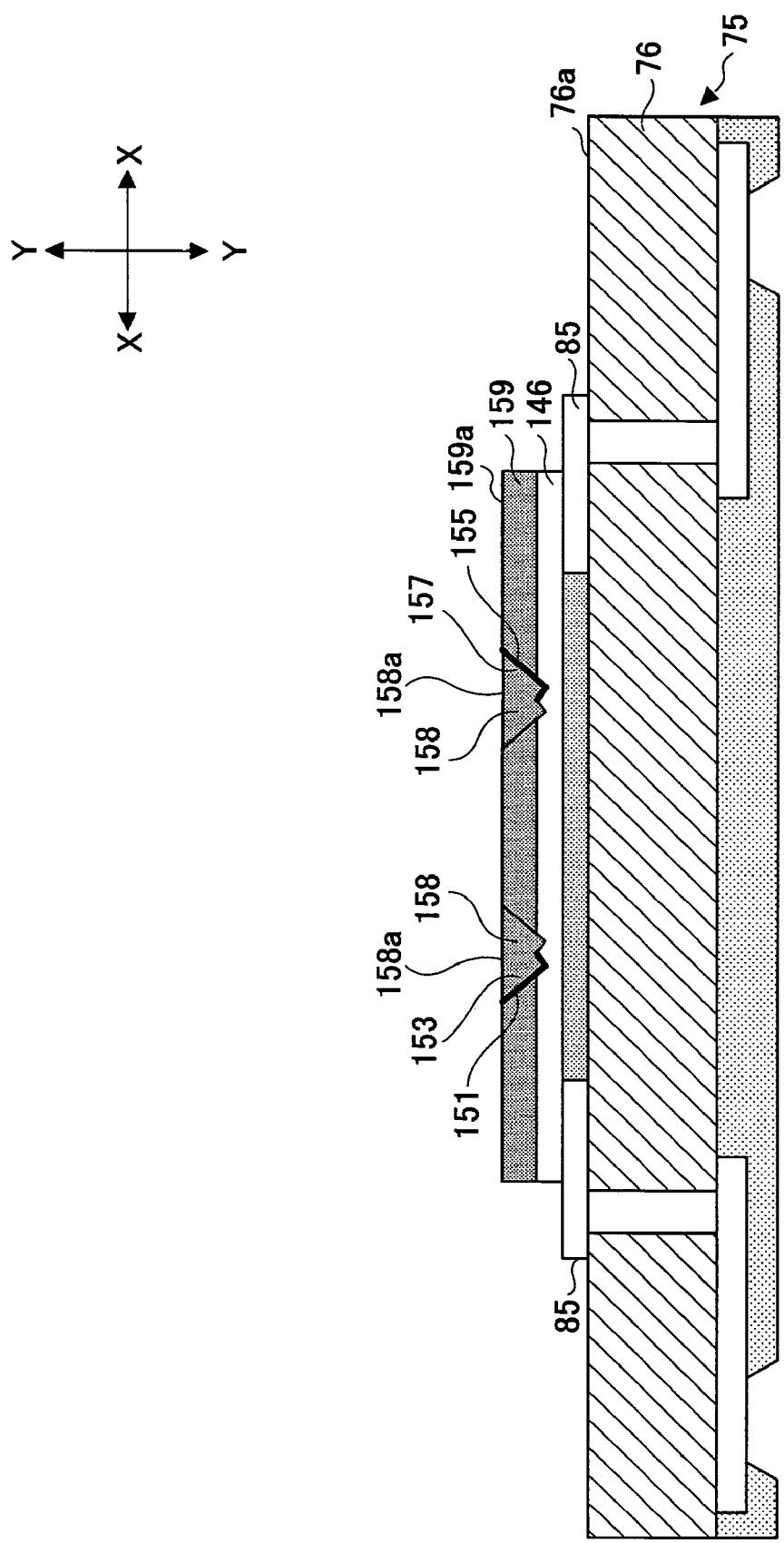
FIG. 23 is a cross-sectional view (No. 5) showing the manufacturing process of the optical waveguide of the second embodiment.

Next, as shown in FIG. 23, the first slot 151 where the first mirror 153 is formed and the second slot 155 where the second mirror 157 is formed are filled up with the core material 158 that is the same material as the core layer 159; and then, the upper surface 158a of the core material 158 and the upper surface 159a of the core layer 159 are made to be the same level (core material filling process).

Since the first slot 151 where the first mirror 153 is formed and the second slot 155 where the second mirror 157 is formed are filled up with the core material 158 that is the same material as the core layer 159 (base material of the core section 147), the first and second mirrors 153 and 157 contact the core material 158, so that attenuation of the optical signal immediately after being reflected by the first and second mirrors 153 and 157 is reduced. Further, the refractive index of the optical path through which the optical signal is transmitted between the first mirror 153 and the second mirror 157 can be made the same as the core section 147.

Figure 24:
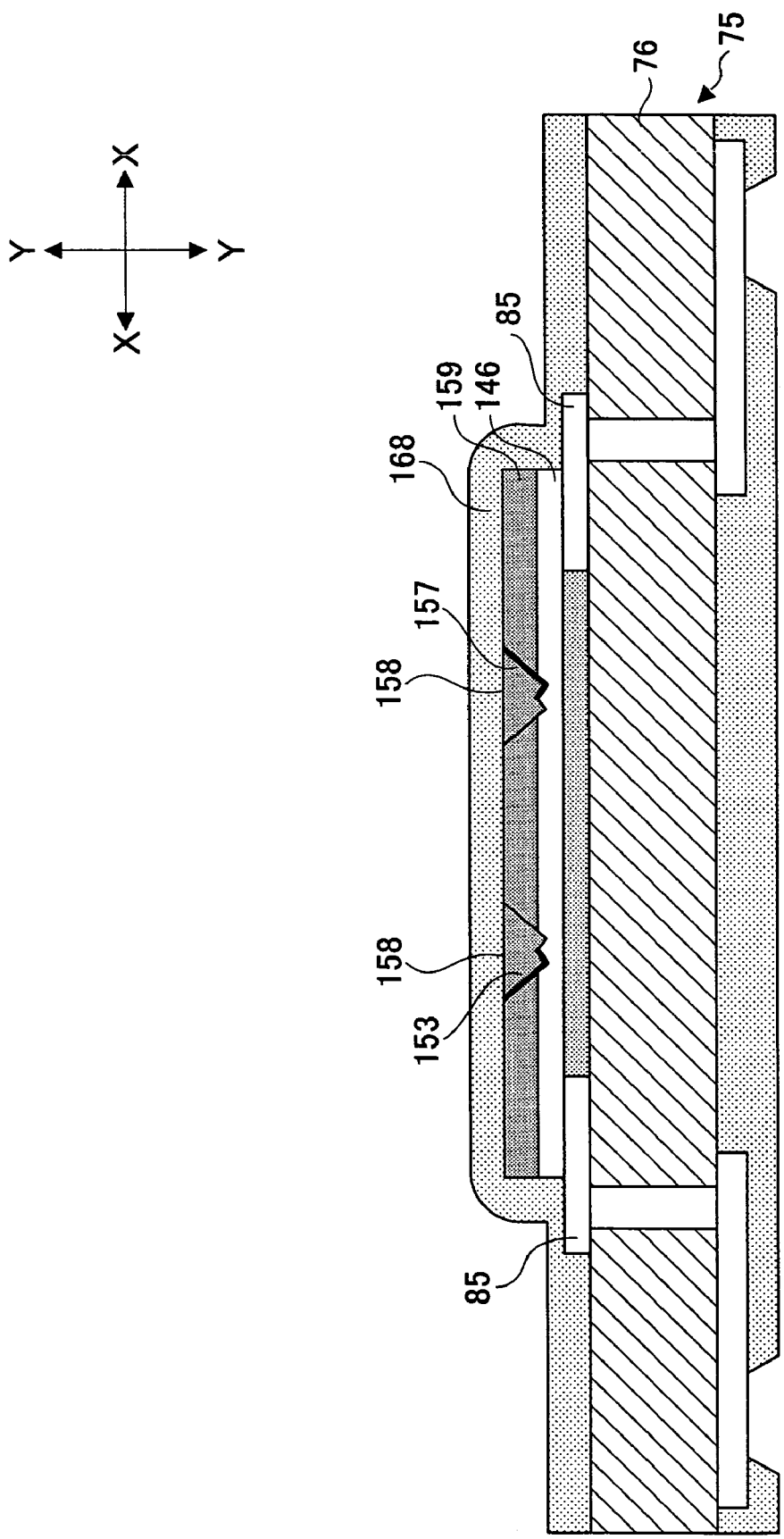
FIG. 24 is a cross-sectional view (No. 6) showing the manufacturing process of the optical waveguide of the second embodiment.

Next, as shown in FIG. 24, a resist layer 168 that is patterned as required for forming the core section 147 is formed on the structure shown in FIG. 23.

Figure 25:
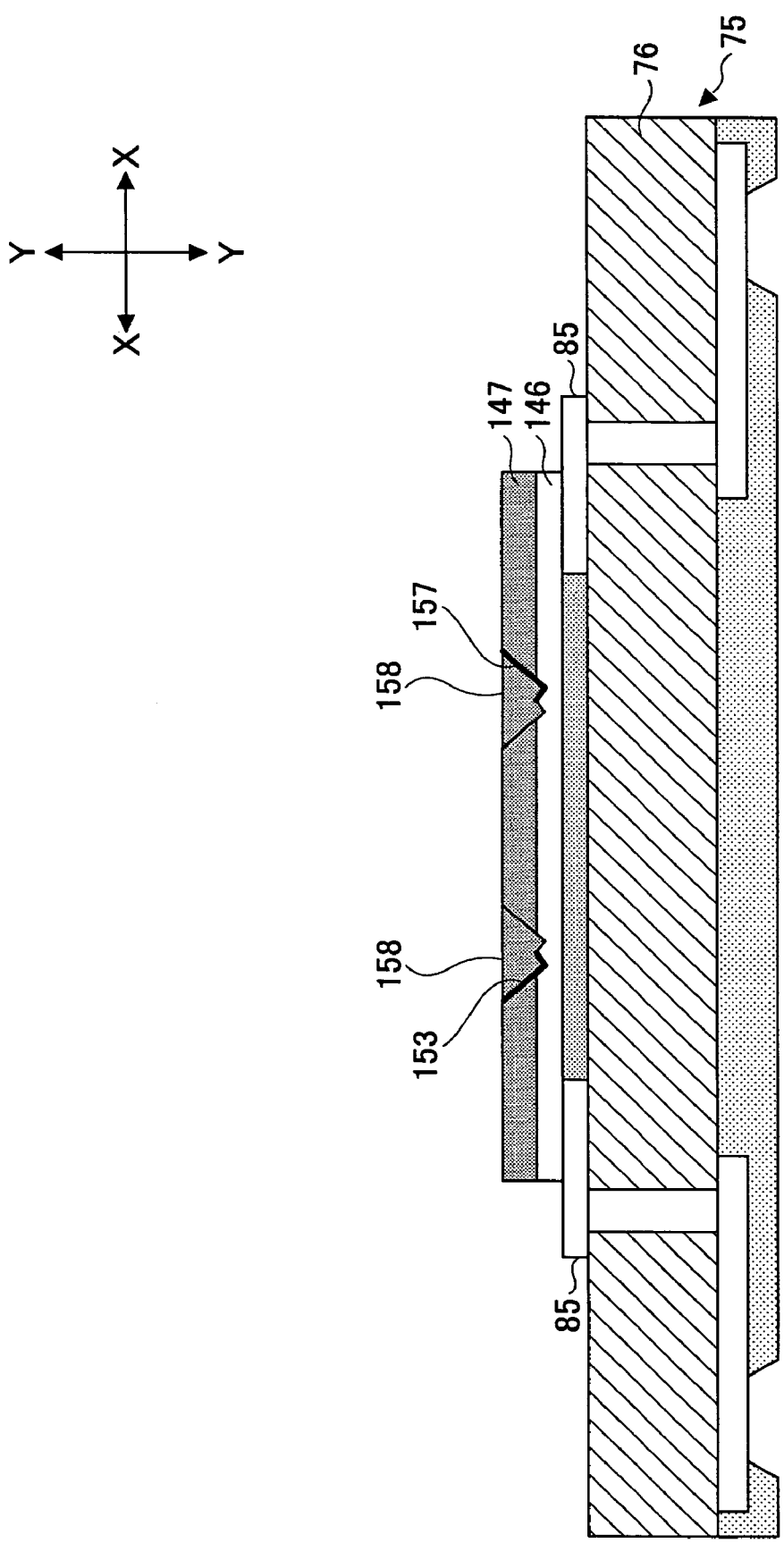
FIG. 25 is a cross-sectional view (No. 7) showing the manufacturing process of the optical waveguide of the second embodiment.

Then, as shown in FIG. 25, etching is carried out on the core layer 159 with the resist layer 168 serving as a mask, and the core section 147 is formed (core section formation process). Further, the resist layer 168 is removed after formation of the core section 147.

Figure 26:
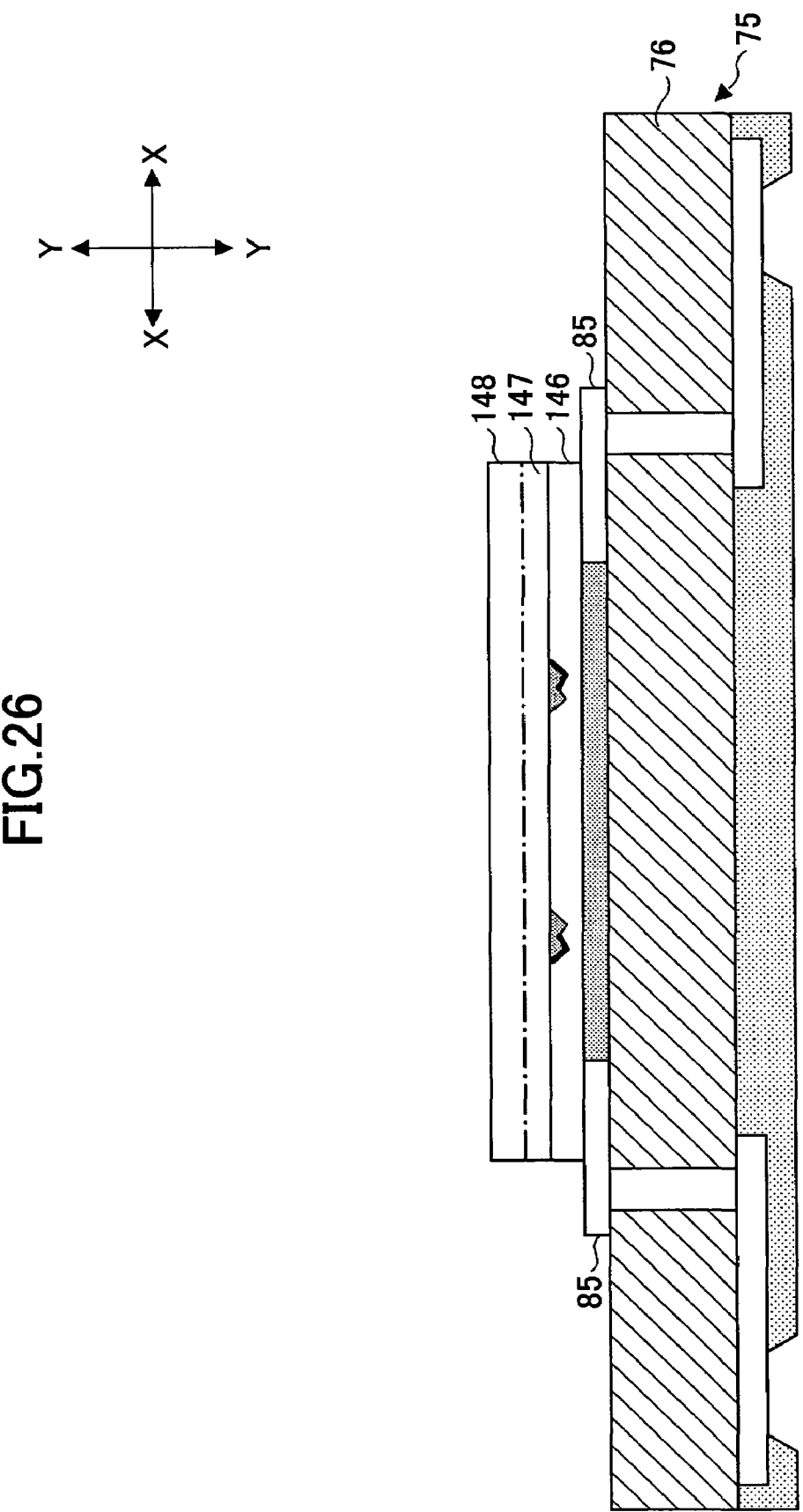
FIG. 26 is a cross-sectional view (No. 8) showing the manufacturing process of the optical waveguide of the second embodiment.

Next, as shown in FIG. 26, the upper clad layer 148 is formed on the lower clad layer 146 so that the upper surface 147C and the sides 147A and 147B (refer to FIG. 31) of the core section 147 are covered (second clad layer formation process). Thickness of the upper clad layer 148 can be set to 50 μm. Then, the optical waveguide 145 of the embodiment is formed in one on the substrate 75 by forming the penetration vias 95A and 95B, the device connection wiring pattern 110, and the solder resist 111 having the openings 112 and 113, the optical entrance 115, and the optical exit 116 by conventional techniques.

As described above, the first slot 151 where the first mirror 153 is formed and the second slot 157 where the second mirror 157 is formed are filled up with the same core material 158 as the material of the core layer 159, the core section 147 is formed by etching the core layer 159, and the core section 147 is covered by the upper clad layer 148. That is, the upper surface 147C and sides 147A and 147B of the core section 147 that is located between the first mirror 153 and the second mirror 157 through which the optical signal is transmitted are covered by the upper clad layer 148 that has a refractive index lower than the core section 147. For this reason, attenuation of the optical signal transmitted between the first mirror 153 and the second mirror 157 is reduced as compared with the optical waveguide 90 of the first embodiment.

As described above,
the lower clad layer 146 and the core layer 159 are formed one by one on the substrate 75,
the first and second slots 151 and 155 that divide the core layer 159 are formed by the blade 124 of the dicer (dicing equipment) being applied to the core layer 159, and
the metal film is formed in the first and second slots 151 and 155 such that the first and second mirrors 153 and 157 are formed; and the optical waveguide 145 is formed in one on the substrate 75 as a part of the manufacturing process of the substrate 75.

Figure 33:
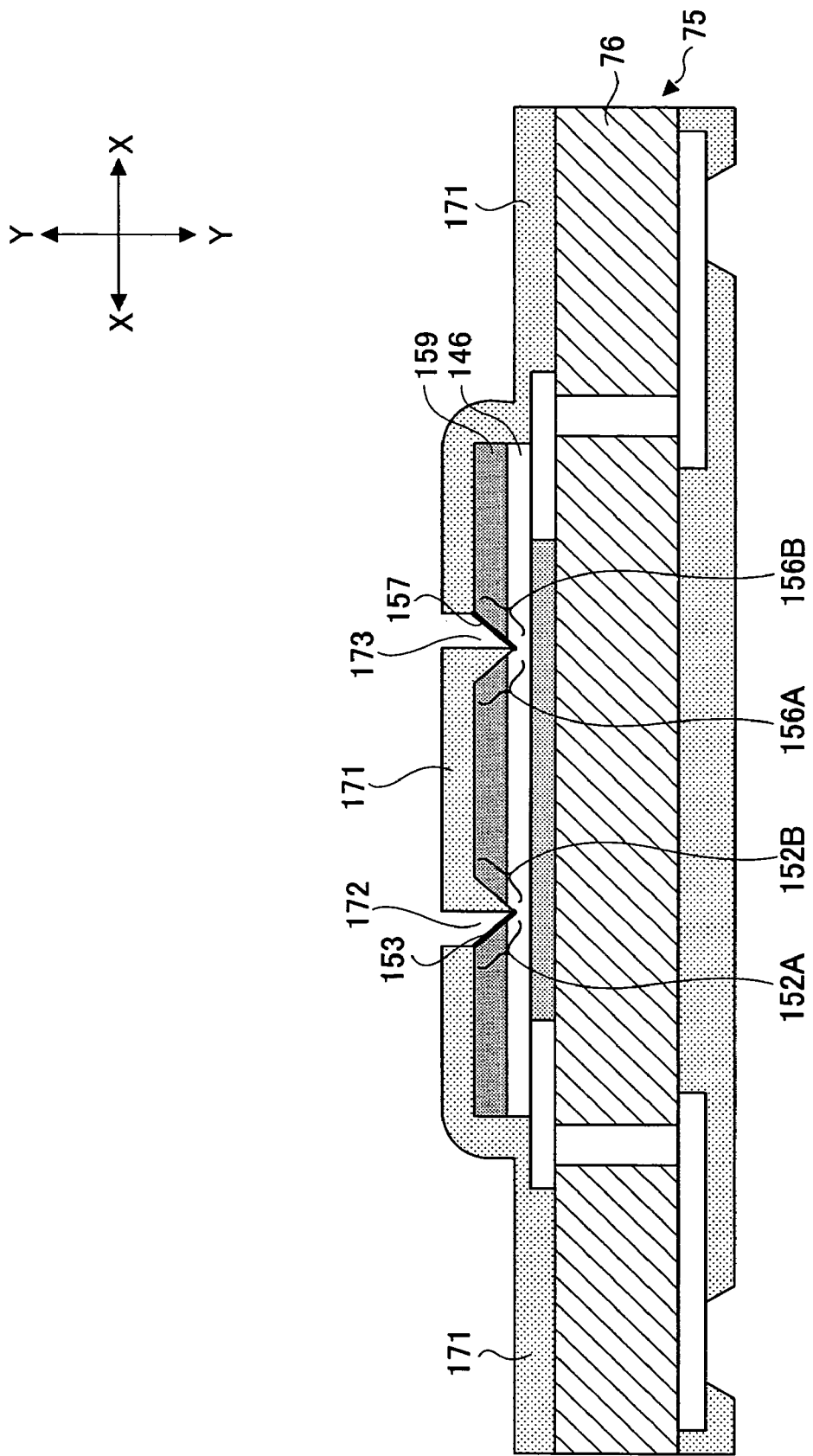
FIG. 33 is a cross-sectional view showing a modification of the manufacturing process of the optical waveguide of the second embodiment.

FIG. 33 shows a modification of the manufacturing process of the optical waveguide of the second embodiment. In FIG. 33, the same reference marks are given to the same components as the optical module 140 shown in FIG. 18. As shown in FIG. 33, a resist layer 171 having an opening 172 for exposing the inclined plane 152A where the first mirror 153 is formed, and an opening 173 for exposing the inclined plane 156B where the second mirror 157 is formed is formed after the slot formation process shown in FIG. 20. Then, a metal film is deposited through the openings 172 and 173 such that the first mirror 153 is formed on the inclined plane 152A and the second mirror 157 is formed on the inclined plane 156B. By forming the first and second mirrors 153 and 157 in this way, the metal film removal process shown in FIG. 22 can be dispensed with, and the manufacturing process of the optical waveguide can be simplified.

Further, the present invention is not limited to these embodiments, but variations and modifications may be made without departing from the scope of the present invention.

In addition, as for the substrate 75 of the first and second embodiments of the present invention, a multilayer wiring structure constituted by two or more insulated layers and wiring layers on both sides of the base material 76 may be used.

(Availability on Industry)

The present invention is applicable to a manufacturing method of an optical waveguide that is formed in one body on a substrate as a part of the manufacturing process of the substrate.

The present application is based on
Japanese Priority Application No. 2004-304677 filed on Oct. 19, 2004 with the Japanese Patent Office, the entire contents of which are hereby incorporated by reference.

What is claimed is:

1. A manufacturing method of an optical waveguide that includes
   a first clad layer,
   a core section for transmitting an optical signal, the core section being formed on the first clad layer, a second clad layer formed on the first clad layer covering the core section, a first mirror for reflecting the optical signal emitted by a luminous source, and leading the optical signal to the core section, and a second mirror for reflecting the optical signal transmitted through the core section, and leading the optical signal to an optical receiver, wherein the optical waveguide is connected to a substrate through the first clad layer, the manufacturing method comprising:

a clad layer and core section formation process of laminating the first clad layer, the core section, and the second clad layer one by one on the substrate;

a slot formation process of forming a first slot that divides the core section from the side of the second clad layer, and a second slot that divide the core section from the side of the second clad layer at a position apart from the first slot; and a mirror formation process of forming the first mirror at the first slot, and the second mirror at the second slot by forming a metal film in the first slot and the second; and a metal film removal process of removing, using a dicer, a first metal film that is a part of the metal film formed by the mirror formation process performed in the first slot, the part being in the core section on the side of the second slot, and a second metal film that is a part of the metal film formed by the mirror formation process performed in the second slot, the part being in the core section on the side of the first slot.

2. The manufacturing method of the optical waveguide as claimed in claim 1, further comprising:

a core material filling process of filling up the first slot where the first mirror is formed and the second slot where the second mirror is formed with a core material that is the material of the core section.

3. A manufacturing method of an optical waveguide that includes a first clad layer, a core section for transmitting an optical signal, the core section being formed on the first clad layer, a second clad layer formed on the first clad layer covering the core section, a first mirror for reflecting the optical signal emitted by a luminous source, and leading the optical signal to the core section, and a second mirror for reflecting the optical signal transmitted through the core section, and leading the optical signal to an optical receiver, wherein the optical waveguide is connected to a substrate through the first clad layer, the manufacturing method comprising:

a first clad layer formation process of forming the first clad layer on the substrate;

a core layer formation process of forming the core layer serving as a base material of the core section on the first clad layer;

a slot formation process of forming a first slot that divides the core layer corresponding to the core section, and a second slot that divides the core layer corresponding to the core section apart from the first slot from the side of the core layer;

a mirror formation process of forming a metal film in the first slot and the second slot, and forming the first mirror in the first slot and the second mirror in the second slot;

a metal film removal process of removing, using a dicer subsequently to the mirror formation process, a first metal film that is a part of the metal film formed by the mirror formation process performed in the first slot, the part being in the core section on the side of the second slot, and a second metal film that is a part of the metal film formed by the mirror formation process performed in the second slot, the part being in the core section on the side of the first slot, a core material filling process of filling up the first slot where the first mirror is formed and the second slot where the second mirror is formed with a core material that is the material of the core section;

a core section formation process of etching the core layer that is filled up with the core material, and forming the core section; and a second clad layer formation process of forming the second clad layer on the first clad layer so that the core section is covered.

* * * * *